United States Patent
Sun et al.

(10) Patent No.: US 9,942,012 B2
(45) Date of Patent: Apr. 10, 2018

(54) CARRIER ALLOCATION METHOD, USER EQUIPMENT, AND BASE STATION

(71) Applicant: Huawei Technologies Co., Ltd., Shenzhen (CN)

(72) Inventors: Jingyuan Sun, Shenzhen (CN); Liang Xia, Shenzhen (CN); Yongxing Zhou, Beijing (CN); Xiaotao Ren, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 14/742,212

(22) Filed: Jun. 17, 2015

(65) Prior Publication Data
US 2015/0288490 A1    Oct. 8, 2015

Related U.S. Application Data

(63) Continuation of application No. PCT/CN2012/086727, filed on Dec. 17, 2012.

(51) Int. Cl.
| *H04W 4/00* | (2009.01) |
| *H04L 5/00* | (2006.01) |
| *H04W 72/04* | (2009.01) |
| *H04W 72/12* | (2009.01) |

(52) U.S. Cl.
CPC .......... *H04L 5/0012* (2013.01); *H04L 5/0051* (2013.01); *H04W 72/042* (2013.01); *H04W 72/0413* (2013.01); *H04W 72/0453* (2013.01); *H04W 72/1263* (2013.01)

(58) Field of Classification Search
None
See application file for complete search history.

(56) References Cited

U.S. PATENT DOCUMENTS

| 7,826,422 | B2 * | 11/2010 | Chu ...................... | H04W 16/02 370/329 |
| 2008/0285490 | A1 * | 11/2008 | Mukai .................. | H04L 5/0007 370/280 |
| 2010/0234037 | A1 * | 9/2010 | Terry .................... | H04L 1/0023 455/450 |

(Continued)

FOREIGN PATENT DOCUMENTS

| CN | 101959249 A | 1/2011 |
| CN | 101998544 A | 3/2011 |

(Continued)

*Primary Examiner* — Kibrom T Hailu
(74) *Attorney, Agent, or Firm* — Slater Matsil, LLP

(57) ABSTRACT

The present invention is applicable to the field of radio communication technologies, and provides a carrier allocation method, a user equipment, and a base station. The method comprises: acquiring, by a base station, a carrier hopping pattern; sending, by the base station to a user equipment UE, carrier configuration information, where the carrier configuration information comprises information about activating carrier hopping and/or the carrier hopping pattern, the carrier hopping pattern presents a carrier set used by a user equipment in at least one time unit, and the carrier set comprises at least one carrier; and sending, by the base station, a signal to the UE and/or receiving a signal from the UE according to the carrier hopping pattern.

20 Claims, 3 Drawing Sheets

(56) References Cited

U.S. PATENT DOCUMENTS

| | | | |
|---|---|---|---|
| 2011/0286397 A1 | 11/2011 | Kim et al. | |
| 2012/0281667 A1 | 11/2012 | Chang et al. | |
| 2013/0114473 A1* | 5/2013 | Awoniyi | H04W 24/10 370/280 |
| 2016/0050652 A1* | 2/2016 | Wu | H04L 5/001 370/329 |

FOREIGN PATENT DOCUMENTS

| | | |
|---|---|---|
| CN | 102348218 A | 2/2012 |
| EP | 1564907 A2 | 8/2005 |
| EP | 2190126 A1 | 5/2010 |
| EP | 2555439 A1 | 2/2013 |
| WO | 2006034578 A1 | 4/2006 |
| WO | 2011120433 A1 | 10/2011 |

* cited by examiner

CARRIER ALLOCATION METHOD, USER EQUIPMENT, AND BASE STATION

This application is a continuation of International Application No. PCT/CN2012/086727, filed on Dec. 17, 2012, which is hereby incorporated by reference in its entirety.

TECHNICAL FIELD

The present invention relates to the field of radio communication technologies, and in particular, to a carrier allocation method, a user equipment, and a base station.

BACKGROUND

Multiple base stations exist on a radio network and each base station controls multiple nodes or cells. For example, a base station controls one macro node and multiple micro nodes covered by the macro node, or a base station controls multiple macro nodes and multiple micro nodes covered by each macro node.

A carrier that may be used by each node to serve a user is determined.

In a non-carrier-aggregation situation, a base station corresponding to a node that serves an individual user equipment (UE) uses one carrier or a pair of carriers to serve the UE.

In a carrier aggregation situation, a base station corresponding to a node that serves the UE may be configured with multiple carriers to serve the UE. The carriers appear as active carriers to the UE.

Within a radio network, for each carrier, service distribution is time-varying; and for each node service distribution is also time-varying. Channel quality of a UE on each carrier is time-varying, and channel quality specific to each node is also time-varying. When on different carriers, a UE has different channel quality, and also is exposed to different strength of interference.

In addition, system bandwidth corresponding to each carrier is also not completely the same. Consequently, a user service capability corresponding to each carrier is also different.

In an existing carrier allocation technology, however, a carrier allocated to a node is determined statically. In this case, each node on a radio network may send a signal to a UE only via a statically determined carrier. In a static carrier configuration, when channel quality of the UE changes dynamically, flexible response to inter-cell interference change and SINR change of the UE is impossible and dynamic carrier selection or dynamic carrier blanking may not be implemented, that is, dynamic selection and coordination of carriers and nodes may not be performed in multi-carrier and multi-node dimensions according to actual service and user channel quality conditions.

SUMMARY

Embodiments of the present invention provide a carrier allocation method, a user equipment, and a base station to solve a problem in the prior art that dynamic carrier selection may not be implemented from aspects of both carrier and node according to an actual service situation.

In a first aspect, a carrier allocation method includes acquiring, by a first base station, a carrier hopping pattern; and sending, by the first base station to a user equipment UE, carrier configuration information. The carrier configuration information includes information about activating carrier hopping and/or the carrier hopping pattern, the carrier hopping pattern presents a carrier set used by the user equipment in at least one time unit, and the carrier set includes at least one carrier. The method further includes sending, by the first base station, a signal to the UE and/or receiving a signal from the UE according to the carrier hopping pattern.

In a first possible implementation of the first aspect, the sending, by the first base station, a signal to the UE and/or receiving a signal from the UE according to the carrier hopping pattern includes sending, by at least one node of the first base station, a signal to the UE and/or receiving a signal from the UE in a time unit determined by the carrier hopping pattern and on a carrier corresponding to the time unit.

With reference to the first aspect or the first possible implementation of the first aspect, in a second possible implementation, the acquiring, by a first base station, a carrier hopping pattern includes acquiring, by the first base station, a pre-configured carrier hopping pattern; and/or acquiring, by the first base station, a carrier hopping pattern determined by the first base station or determined by another network device.

With reference to the first aspect or the first possible implementation of the first aspect or the second possible implementation of the first aspect, in a third possible implementation, the carrier hopping pattern is used to indicate a carrier set used by at least one node of the first base station in at least one time unit within a period of the carrier hopping pattern to send a signal to the UE and/or receive a signal sent by the UE.

With reference to the first aspect or the first possible implementation of the first aspect or the second possible implementation of the first aspect, in a fourth possible implementation, the sending, by the first base station, a signal to the UE and/or receiving a signal from the UE according to the carrier hopping pattern includes sending, by the first base station according to a first carrier hopping pattern, a data signal to the UE; and/or receiving, by the first base station according to a second carrier hopping pattern, a data signal sent by the UE; and/or sending, by the first base station according to a third carrier hopping pattern, a downlink reference signal to the UE; and/or receiving, by the first base station according to a fourth carrier hopping pattern, an uplink reference signal sent by the UE.

With reference to the first aspect or the first possible implementation of the first aspect or the second possible implementation of the first aspect, in a fifth possible implementation, the sending, by the first base station, a signal to the UE and/or receiving a signal from the UE according to the carrier hopping pattern includes sending, by the first base station according to a fifth carrier hopping pattern, a first downlink reference signal to the UE; and/or sending, by the first base station according to a sixth carrier hopping pattern, a second downlink reference signal to the UE.

With reference to the fifth possible implementation of the first aspect, in a sixth possible implementation, after the sending, by the first base station according to the fifth carrier hopping pattern, the first downlink reference signal to the UE, the method further includes receiving, by the first base station, a measurement result obtained by the UE according to the first downlink reference signal. The measurement result includes channel state information CSI. The method further includes, after the sending, by the first base station according to a sixth carrier hopping pattern, a second downlink reference signal to the UE, the method further includes receiving, by the first base station, a measurement result obtained by the UE according to the second downlink reference signal, where the measurement result includes at least one of reference signal received power RSRP, reference signal received quality RSRQ, and reference signal strength indicator RSSI.

With reference to the first aspect or the first possible implementation of the first aspect or the second possible implementation of the first aspect, in a seventh possible implementation, the sending, by the first base station, a signal to the UE and/or receiving a signal from the UE according to the carrier hopping pattern includes receiving, by the first base station according to a seventh carrier hopping pattern, a first uplink reference signal sent by the UE; and/or receiving, by the first base station according to an eighth carrier hopping pattern, a second uplink reference signal sent by the UE.

With reference to the first possible implementation of the first aspect or the second possible implementation of the first aspect or the third possible implementation of the first aspect or the fourth possible implementation of the first aspect or the fifth possible implementation of the first aspect or the sixth possible implementation of the first aspect or the seventh possible implementation of the first aspect, in an eighth possible implementation, sending, by the first base station, the carrier hopping pattern to the UE includes sending, by the first base station, all or part of the carrier hopping patterns to the UE; or sending, by the first base station, part of or an entire of one carrier hopping pattern to the UE.

With reference to the eighth possible implementation of the first aspect, in a ninth possible implementation, the sending, by the first base station, part of the carrier hopping patterns to the UE includes sending, by the first base station to the UE, a carrier hopping pattern used when serving the UE.

With reference to the ninth possible implementation of the first aspect, in a tenth possible implementation, the sending, by the first base station to the UE, a carrier hopping pattern used when serving the UE includes sending, by the first base station to the UE, part or all of the carrier hopping pattern used when serving the UE.

With reference to the tenth possible implementation of the first aspect, in an eleventh possible implementation, the sending, by the first base station to the UE, part or all of the carrier hopping pattern used when serving the UE includes sending, by the first base station to the UE, part of or an entire of at least one carrier hopping pattern used by each node or node set among nodes serving the UE when serving the UE; and/or sending, by the first base station to the UE, information about nodes serving the UE and part of or an entire of at least one carrier hopping pattern used by each node or node set among the nodes; and/or sending, by the first base station to the UE, information about nodes serving the UE and part of or an entire of at least one carrier hopping pattern used by each node or node set among the nodes when serving the UE.

With reference to the implementation of the first aspect, in a twelfth possible implementation, at least one node of the first base station does not perform coordination carrier hopping; and/or at least one carrier of at least one node of the first base station does not perform carrier hopping.

With reference to the first possible implementation of the first aspect or the second possible implementation of the first aspect or the third possible implementation of the first aspect or the fourth possible implementation of the first aspect or the fifth possible implementation of the first aspect or the sixth possible implementation of the first aspect or the seventh possible implementation of the first aspect or the eighth possible implementation of the first aspect or the ninth possible implementation of the first aspect or the tenth possible implementation of the first aspect or the eleventh possible implementation of the first aspect or the twelfth possible implementation of the first aspect, in a thirteenth possible implementation, a second base station includes at least one node, and after the acquiring, by a first base station, a carrier hopping pattern, the method further includes sending, by the first base station, a carrier hopping pattern used by a node of the first base station to the second base station; and/or receiving, by the first base station, a carrier hopping pattern which is used by a node of the second base station and sent by the second base station.

With reference to the first possible implementation of the first aspect or the second possible implementation of the first aspect or the third possible implementation of the first aspect or the fourth possible implementation of the first aspect or the fifth possible implementation of the first aspect or the sixth possible implementation of the first aspect or the seventh possible implementation of the first aspect or the eighth possible implementation of the first aspect or the ninth possible implementation of the first aspect or the tenth possible implementation of the first aspect or the eleventh possible implementation of the first aspect, in a fourteenth possible implementation, a user equipment is a user equipment that supports data receiving over only one carrier at the same time.

In a second aspect, the carrier allocation method includes receiving, by a user equipment UE, carrier configuration information sent by a first base station, where the carrier configuration information includes information about activating carrier hopping and/or a carrier hopping pattern. The carrier hopping pattern presents a carrier set used by the user equipment in at least one time unit, and the carrier set includes at least one carrier. The method further includes sending, by the UE, a signal to the first base station and/or receiving a signal from the first base station according to the carrier hopping pattern.

In a first possible implementation of the second aspect, the sending, by the UE, a signal to the first base station and/or receiving a signal from the first base station according to the carrier hopping pattern includes receiving, by the UE, a signal sent by at least one node of the first base station and/or sending a signal to at least one node of the first base station in a time unit determined by the carrier hopping pattern and on a carrier corresponding to the time unit.

With reference to the second aspect or the first possible implementation of the second aspect, in a second possible implementation, the carrier hopping pattern is pre-configured; and/or the carrier hopping pattern is determined by the first base station or another network device.

With reference to the second aspect or the first possible implementation of the second aspect or the second implementation of the second aspect, in a third possible implementation, the carrier hopping pattern is used to indicate a carrier set used by at least one node of the first base station in at least one time unit within a period of the carrier hopping pattern to send a signal to the UE and/or receive a signal sent by the UE.

With reference to the second aspect or the first possible implementation of the second aspect or the second possible implementation of the second aspect, in a fourth possible implementation, the sending a signal to the first base station and/or receiving a signal from the first base station according to the carrier hopping pattern includes receiving, by the UE according to a first carrier hopping pattern, a data signal sent by the first base station; and/or sending, by the UE according to a second carrier hopping pattern, a data signal to the first base station; and/or, receiving, by the UE according to a third carrier hopping pattern, a downlink reference signal sent by the first base station; and/or, sending, by the UE according to a fourth carrier hopping pattern, an uplink reference signal to the first base station.

With reference to the second aspect or the first possible implementation of the second aspect or the second possible implementation of the second aspect, in a fifth possible implementation, the sending a signal to the first base station and/or receiving a signal from the first base station according to the carrier hopping pattern includes receiving, by the UE according to a fifth carrier hopping pattern, a first downlink reference signal sent by the first base station; and/or receiving, by the UE according to a sixth carrier hopping pattern, a second downlink reference signal sent by the first base station.

With reference to the fifth possible implementation of the second aspect, in a sixth possible implementation, after the receiving, by the UE according to a fifth carrier hopping pattern, a first downlink reference signal from the first base station, the method further includes sending, by the UE to the first base station, a measurement result obtained according to the first downlink reference signal, where the measurement result includes channel state information CSI; and after the receiving, by the UE according to a sixth carrier hopping pattern, a second downlink reference signal sent by the first base station, the method further includes sending, by the UE to the first base station, a measurement result obtained according to the second downlink reference signal, where the measurement result includes at least one of reference signal received power RSRP, reference signal received quality RSRQ, and reference signal strength indicator RSSI.

With reference to the first aspect or the second possible implementation of the second aspect or the second possible implementation of the second aspect, in a seventh possible implementation, the sending a signal to the first base station and/or receiving a signal from the first base station according to the carrier hopping pattern includes sending, by the UE according to a seventh carrier hopping pattern, a first uplink reference signal to the first base station; and/or sending, by the UE according to an eighth carrier hopping pattern, a second uplink reference signal to the first base station.

With reference to the second aspect or the first possible implementation of the second aspect or the second possible implementation of the second aspect or the third possible implementation of the second aspect or the fourth possible implementation of the second aspect or the fifth possible implementation of the second aspect or the sixth possible implementation of the second aspect or the seventh possible implementation of the second aspect, in an eighth possible implementation, the receiving, by a UE, a carrier hopping pattern sent by a first base station includes receiving, by the UE, all or part of the carrier hopping patterns sent by the first base station; or receiving, by the UE, part of or an entire of one carrier hopping pattern sent by the first base station.

With reference to the eighth possible implementation of the second aspect, in a ninth possible implementation, the receiving, by the UE, part of the carrier hopping patterns sent by the first base station includes receiving, by the UE, a carrier hopping pattern used when serving the UE from the first base station.

With reference to the ninth possible implementation of the second aspect, in a tenth possible implementation, the receiving, by the UE, a carrier hopping pattern used when serving the UE from the first base station includes receiving, by the UE, part or all of the carrier hopping pattern used when serving the UE from the first base station.

With reference to the tenth possible implementation of the second aspect, in an eleventh possible implementation, the receiving, by the UE, part or all of the carrier hopping pattern used when serving the UE from the first base station includes receiving, by the UE from the first base station, part of or an entire of at least one carrier hopping pattern used by each node or node set among nodes serving the UE when serving the UE; and/or receiving, by the UE from the first base station, information about nodes serving the UE and part of or an entire of at least one carrier hopping pattern used by each node or node set among the nodes; and/or receiving, by the UE from the first base station, information about nodes serving the UE and part of or an entire of at least one carrier hopping pattern used by each node or node set among the nodes when serving the UE.

With reference to the second aspect or the first possible implementation of the second aspect or the second possible implementation of the second aspect or the third possible implementation of the second aspect or the fourth possible implementation of the second aspect or the fifth possible implementation of the second aspect or the sixth possible implementation of the second aspect or the seventh possible implementation of the second aspect or the eighth possible implementation of the second aspect or the ninth possible implementation of the second aspect or the tenth possible implementation of the second aspect or the eleventh possible implementation of the second aspect, in a twelfth possible implementation, the user equipment is a user equipment that supports data receiving over only one carrier at the same time.

In a third aspect, the base station includes a pattern acquiring unit configured to acquire a carrier hopping pattern; and a configuration information sending unit configured to send carrier configuration information to a user equipment UE. The carrier configuration information includes information about activating carrier hopping and/or the carrier hopping pattern, the carrier hopping pattern presents a carrier set used by a user equipment in at least one time unit, and the carrier set includes at least one carrier. The base station further includes a signal interaction unit configured to send a signal to the UE and/or receive a signal from the UE according to the carrier hopping pattern.

In a first possible implementation of the third aspect, sending, by a signal interaction unit by using at least one node of the first base station, a signal to the UE and/or receiving a signal from the UE in a time unit determined by the carrier hopping pattern and on a carrier corresponding to the time unit.

With reference to the third aspect or the first possible implementation of a third aspect, the pattern acquiring unit includes a first pattern acquiring module, configured to acquire a pre-configured carrier hopping pattern; and/or a second pattern acquiring module, configured to acquire a carrier hopping pattern determined by the base station or determined by another network device.

With reference to the third aspect or the first possible implementation of the third aspect or the second implementation of the third aspect, in a third possible implementation, the carrier hopping pattern is used to indicate a carrier set used by at least one node of the first base station in at least one time unit within a period of the carrier hopping pattern, to send a signal to the UE and/or receive a signal sent by the UE.

With reference to the third aspect or the first possible implementation of the third aspect or the second implementation of the third aspect, in a fourth possible implementation, the signal interaction unit includes a data signal sending module, configured to send, according to a first carrier hopping pattern, a data signal to the UE; and/or a data signal receiving module, configured to receive, according to a second carrier hopping pattern, a data signal sent by the UE; and/or a downlink reference signal sending module, configured to send, according to a third carrier hopping pattern, a downlink reference signal to the UE; and/or an uplink reference signal receiving module, configured to receive, according to a fourth carrier hopping pattern, an uplink reference signal sent by the UE.

With reference to the third aspect or the first possible implementation of the third aspect or the second implementation of the third aspect, in a fifth possible implementation, the signal interaction unit further includes a first downlink reference signal sending module, configured to send, according to a fifth carrier hopping pattern, a first downlink reference signal to the UE; and/or a second downlink reference signal sending module, configured to send, according to a sixth carrier hopping pattern, a second downlink reference signal to the UE.

With reference to the fifth possible implementation of the third aspect, in a sixth possible implementation, the signal interaction unit further includes a first measurement result receiving module, configured to receive a measurement result obtained by the UE according to the first downlink reference signal, where the measurement result includes channel state information CSI; and a second measurement result receiving module, configured to receive a measurement result obtained by the UE according to the second downlink reference signal, where the measurement result includes at least one of reference signal received power RSRP, reference signal received quality RSRQ, and reference signal strength indicator RSSI.

With reference to the third aspect or the first possible implementation of the third aspect or the second implementation of the third aspect, in a seventh possible implementation, the signal interaction unit further includes a first uplink reference signal receiving module, configured to receive, according to a seventh carrier hopping pattern, a first uplink reference signal sent by the UE; and/or a second uplink reference signal receiving module, configured to receive, according to an eighth carrier hopping pattern, a second uplink reference signal sent by the UE.

With reference to the first possible implementation of the third aspect or the second possible implementation of the third aspect or the third possible implementation of the third aspect or the fourth possible implementation of the third aspect or the fifth possible implementation of the third aspect or the sixth possible implementation of the third aspect or the seventh possible implementation of the third aspect, in an eighth possible implementation, the configuration information sending unit includes a first configuration information sending module, configured to send all or part of the carrier hopping patterns to the UE; or a second configuration information sending module, configured to send part of or an entire of one carrier hopping pattern to the UE.

With reference to the eighth possible implementation of the third aspect, in a ninth possible implementation, the first configuration information sending module sends, to the UE, a carrier hopping pattern used when serving the UE.

With reference to the ninth possible implementation of the third aspect, in a tenth possible implementation, the first configuration information sending module sends, to the UE, part or all of the carrier hopping pattern used when serving the UE.

With reference to the tenth possible implementation of the third aspect, in an eleventh possible implementation, the first configuration information sending module includes a first sending submodule, configured to send, to the UE, part of or an entire of at least one carrier hopping pattern used by each node or node set among nodes serving the UE when serving the UE; and/or a second sending submodule, configured to send, to the UE, information about nodes serving the UE and part of or an entire of at least one carrier hopping pattern used by each node or node set among the nodes; and/or a third sending submodule, configured to send, to the UE, information about nodes serving the UE and part of or an entire of at least one carrier hopping pattern used by each node or node set among the nodes when serving the UE.

With reference to the implementation of the third aspect, in a twelfth possible implementation, at least one node of the base station does not perform coordination carrier hopping; and/or at least one carrier of at least one node of the base station does not perform coordination carrier hopping.

With reference to the first possible implementation of the third aspect or the second possible implementation of the third aspect or the third possible implementation of the third aspect or the fourth possible implementation of the third aspect or the fifth possible implementation of the third aspect or the sixth possible implementation of the third aspect or the seventh possible implementation of the third aspect or the eighth possible implementation of the third aspect or the ninth possible implementation of the third aspect or the tenth possible implementation of the third aspect or the eleventh possible implementation of the third aspect or the twelfth possible implementation of the third aspect, in a thirteenth possible implementation, the second base station includes at least one node, where the first base station further includes a carrier pattern sending unit, configured to send a carrier hopping pattern used by a node of the first base station to the second base station; and/or a carrier pattern receiving unit, configured to receive a carrier hopping pattern which is used by a node of the second base station and sent by the second base station.

With reference to the first possible implementation of the third aspect or the second possible implementation of the third aspect or the third possible implementation of the third aspect or the fourth possible implementation of the third aspect or the fifth possible implementation of the third aspect or the sixth possible implementation of the third aspect or the seventh possible implementation of the third aspect or the eighth possible implementation of the third aspect or the ninth possible implementation of the third aspect or the tenth possible implementation of the third aspect or the eleventh possible implementation of the third aspect, in a fourteenth possible implementation, the user equipment is a user equipment that supports data receiving over only one carrier at the same time.

In a fourth aspect, the base station includes: a transceiver, where the transceiver is configured to acquire a carrier hopping pattern, and is configured to send carrier configuration information to a user equipment UE, where the carrier configuration information includes information about activating carrier hopping and/or the carrier hopping pattern, the carrier hopping pattern presents a carrier set used by a user equipment in at least one time unit, and the carrier set includes at least one carrier, and is further configured to send, according to the carrier hopping pattern, a signal to the UE and/or receive a signal from the UE.

In a first possible implementation of the fourth aspect, through at least one node of the first base station, the transceiver sends a signal to the UE and/or receives a signal from the UE in a time unit determined by the carrier hopping pattern and on a carrier corresponding to the time unit.

With reference to the fourth aspect or the first possible implementation of the fourth aspect, in a second possible implementation, the transceiver acquires a pre-configured carrier hopping pattern; and/or acquiring, by the transceiver, the carrier hopping pattern determined by the base station or determined by another network device.

With reference to the fourth aspect or the first possible implementation of the fourth aspect or the second implementation of the fourth aspect, in a third possible implementation, the carrier hopping pattern is used to indicate a carrier set used by at least one node of the first base station in at least one time unit within a period of the carrier hopping pattern to send a signal to the UE and/or receive a signal sent by the UE.

With reference to the fourth aspect or the first possible implementation of the fourth aspect or the second possible implementation of the fourth aspect, in a fourth possible implementation, the transceiver sends, according to a first carrier hopping pattern, a data signal to the UE; and/or the transceiver receives, according to a second carrier hopping pattern, a data signal sent by the UE; and/or the transceiver sends, according to a third carrier hopping pattern, a downlink reference signal to the UE; and/or the transceiver receives, according to a fourth carrier hopping pattern, an uplink reference signal sent by the UE.

With reference to the fourth aspect or the first possible implementation of the fourth aspect or the second possible implementation of the fourth aspect, in a fifth possible implementation, the transceiver sends, according to a fifth carrier hopping pattern, a first downlink reference signal to the UE; and/or the transceiver sends, according to a sixth carrier hopping pattern, a second downlink reference signal to the UE.

With reference to the fifth possible implementation of the fourth aspect, in a sixth possible implementation, the transceiver receives a measurement result obtained by the UE according to the first downlink reference signal, where the measurement result includes channel state information CSI. The transceiver receives a measurement result obtained by the UE according to the second downlink reference signal, where the measurement result includes at least one of reference signal received power RSRP, reference signal received quality RSRQ, and reference signal strength indicator RSSI.

With reference to the fourth aspect or the first possible implementation of the fourth aspect or the second possible implementation of the fourth aspect, in a seventh possible implementation, the transceiver receives, according to a seventh carrier hopping pattern, a first uplink reference signal sent by the UE; and/or the transceiver receives, according to an eighth carrier hopping pattern, a second uplink reference signal sent by the UE.

With reference to the first possible implementation of the fourth aspect or the second possible implementation of the fourth aspect or the third possible implementation of the fourth aspect or the fourth possible implementation of the fourth aspect or the fifth possible implementation of the fourth aspect or the sixth possible implementation of the fourth aspect or the seventh possible implementation of the fourth aspect, in an eighth possible implementation, the transceiver sends all or part of the carrier hopping patterns to the UE; or the transceiver sends part of or an entire of one carrier hopping pattern to the UE.

With reference to the eighth possible implementation of the fourth aspect, in a ninth possible implementation, the transceiver sends, to the UE, a carrier hopping pattern used when serving the UE.

With reference to the ninth possible implementation of the fourth aspect, in a tenth possible implementation, the transceiver sends, to the UE, part or all of the carrier hopping pattern used when serving the UE.

With reference to the tenth possible implementation of the fourth aspect, in an eleventh possible implementation, the transceiver sends, to the UE, part of or an entire of at least one carrier hopping pattern used by each node or node set among nodes serving the UE when serving the UE; and/or, the transceiver sends, to the UE, information about nodes serving the UE and part of or an entire of at least one carrier hopping pattern used by each node or node set among the nodes; and/or, the transceiver sends, to the UE, information about nodes serving the UE and part of or an entire of at least one carrier hopping pattern used by each node or node set among the nodes when serving the UE.

With reference to the implementation of the fourth aspect, in a twelfth possible implementation, at least one node of the base station does not perform coordination carrier hopping; and/or at least one carrier of at least one node of the base station does not perform coordination carrier hopping.

With reference to the first possible implementation of the fourth aspect or the second possible implementation of the fourth aspect or the third possible implementation of the fourth aspect or the fourth possible implementation of the fourth aspect or the fifth possible implementation of the fourth aspect or the sixth possible implementation of the fourth aspect or the seventh possible implementation of the fourth aspect or the eighth possible implementation of the fourth aspect or the ninth possible implementation of the fourth aspect or the tenth possible implementation of the fourth aspect or the eleventh possible implementation of the fourth aspect or the twelfth possible implementation of the fourth aspect, in a thirteenth possible implementation, the second base station includes at least one node, where the transceiver sends a carrier hopping pattern used by a node of the first base station to the second base station; and/or the transceiver receives a carrier hopping pattern which is used by a node of the second base station and is sent by the second base station.

With reference to the first possible implementation of the fourth aspect or the second possible implementation of the fourth aspect or the third possible implementation of the fourth aspect or the fourth possible implementation of the fourth aspect or the fifth possible implementation of the fourth aspect or the sixth possible implementation of the fourth aspect or the seventh possible implementation of the fourth aspect or the eighth possible implementation of the fourth aspect or the ninth possible implementation of the fourth aspect or the tenth possible implementation of the fourth aspect or the eleventh possible implementation of the fourth aspect, in a fourteenth possible implementation, the user equipment is a user equipment that supports data receiving over only one carrier at the same time.

In a fifth aspect, the user equipment includes a configuration information receiving unit, configured to receive carrier configuration information sent by a first base station, where the carrier configuration information includes information about activating carrier hopping and/or a carrier hopping pattern, the carrier hopping pattern presents a carrier set used by the user equipment in at least one time unit, and the carrier set includes at least one carrier. A signal transceiver unit is configured to send a signal to the first base station and/or receive a signal from the first base station according to the carrier hopping pattern.

In a first possible implementation of the fifth aspect, the signal transceiver unit receives a signal sent by at least one node of the first base station and/or sends a signal to at least one node of the first base station in a time unit determined by the carrier hopping pattern and on a carrier corresponding to the time unit.

With reference to the fifth aspect or the first possible implementation of the fifth aspect, in a second possible implementation, the carrier hopping pattern is pre-configured; and/or the carrier hopping pattern is determined by the first base station or another network device.

With reference to the fifth aspect or the first possible implementation of the fifth aspect or the second implementation of the fifth aspect, in a third possible implementation, the carrier hopping pattern is used to indicate a carrier set used by at least one node of the first base station in at least one time unit within a period of the carrier hopping pattern to send a signal to the UE and/or receive a signal sent by the UE.

With reference to the fifth aspect or the first possible implementation of the fifth aspect or the second implementation of the fifth aspect, in a fourth possible implementation, the signal transceiver unit includes a data signal receiving module, configured to receive, according to a first carrier hopping pattern, a data signal sent by the first base station; and/or a data signal sending module, configured to send, according to a second carrier hopping pattern, a data signal to the first base station; and/or a downlink reference signal receiving module, configured to receive, according to a third carrier hopping pattern, a downlink reference signal sent by the first base station; and/or an uplink reference signal sending module, configured to send, according to a fourth carrier hopping pattern, an uplink reference signal to the first base station.

With reference to the fifth aspect or the first possible implementation of the fifth aspect or the second implementation of the fifth aspect, in a fifth possible implementation, the signal transceiver unit includes a first downlink reference signal receiving module, configured to receive, according to a fifth carrier hopping pattern, a first downlink reference signal sent by the first base station; and/or a second downlink reference signal receiving module, configured to receive, according to a sixth carrier hopping pattern, a second downlink reference signal sent by the first base station.

With reference to the fifth possible implementation of the fifth aspect, in a sixth possible implementation, the signal transceiver unit further includes a first measurement result sending module, configured to send, to the first base station, a measurement result obtained according to the first downlink reference signal, where the measurement result includes channel state information CSI; and a second measurement result sending module, configured to send, to the first base station, a measurement result obtained according to the second downlink reference signal, where the measurement result includes at least one of reference signal received power RSRP, reference signal received quality RSRQ, and reference signal strength indicator RSSI.

With reference to the fifth aspect or the first possible implementation of the fifth aspect or the second implementation of the fifth aspect, in a seventh possible implementation, the signal transceiver unit further includes a first uplink reference signal sending module, configured to send, according to a seventh carrier hopping pattern, a first uplink reference signal to the first base station; and/or a second uplink reference signal sending module, configured to send, according to an eighth carrier hopping pattern, a second uplink reference signal to the first base station.

With reference to the fifth aspect or the first possible implementation of the fifth aspect or the second possible implementation of the fifth aspect or the third possible implementation of the fifth aspect or the fourth possible implementation of the fifth aspect or the fifth possible implementation of the fifth aspect or the sixth possible implementation of the fifth aspect or the seventh possible implementation of the fifth aspect, in an eighth possible implementation, the configuration information receiving unit includes a first carrier pattern receiving module, configured to receive all or part of the carrier hopping patterns sent by the first base station; or a second carrier pattern receiving module, configured to receive part of or an entire of one carrier hopping pattern sent by the first base station.

With reference to the eighth possible implementation of the fifth aspect, in a ninth possible implementation, the receiving, by the first carrier pattern receiving module, a carrier hopping pattern used when serving the UE from the first base station.

With reference to the ninth possible implementation of the fifth aspect, in a tenth possible implementation, the first carrier pattern receiving module receives part or all of the carrier hopping pattern used when serving the UE from the first base station.

With reference to the tenth possible implementation of the fifth aspect, in an eleventh possible implementation, the first carrier pattern receiving module receives from the first base station part of or an entire of at least one carrier hopping pattern used by each node or node set among nodes serving the UE when serving the UE; and/or receives from the first base station information about nodes serving the UE and part of or an entire of at least one carrier hopping pattern used by each node or node set among the nodes; and/or receives from the first base station information about nodes serving the UE and part of or an entire of at least one carrier hopping pattern used by each node or node set among the nodes when serving the UE.

With reference to the fifth aspect or the first possible implementation of the fifth aspect or the second possible implementation of the fifth aspect or the third possible implementation of the fifth aspect or the fourth possible implementation of the fifth aspect or the fifth possible implementation of the fifth aspect or the sixth possible implementation of the fifth aspect or the seventh possible implementation of the fifth aspect or the eighth possible implementation of the fifth aspect or the ninth possible implementation of the fifth aspect or the tenth possible implementation of the fifth aspect or the eleventh possible implementation of the fifth aspect, in a twelfth possible implementation, the user equipment is a user equipment that supports data receiving over only one carrier at the same time.

In a sixth aspect, the user equipment includes: a transceiver, where the transceiver is configured to receive carrier configuration information sent by a first base station, where the carrier configuration information includes information about activating carrier hopping and/or a carrier hopping pattern, the carrier hopping pattern presents a carrier set used by a user equipment in at least one time unit, and the carrier set includes at least one carrier; and is further configured to send a signal to the first base station and/or receive a signal from the first base station according to the carrier hopping pattern.

In a first possible implementation of the sixth aspect, the transceiver receives a signal sent by at least one node of the first base station and/or sends a signal to at least one node of the first base station in a time unit determined by the carrier hopping pattern and on a carrier corresponding to the time unit.

With reference to the sixth aspect or the first possible implementation of the sixth aspect, in a second possible implementation, the carrier hopping pattern is pre-configured; and/or the carrier hopping pattern is determined by the first base station or another network device.

With reference to the sixth aspect or the first possible implementation of the sixth aspect or the second implementation of the sixth aspect, in a third possible implementation, the carrier hopping pattern is used to indicate a carrier set used by at least one node of the first base station in at least one time unit within a period of the carrier hopping pattern to send a signal to the UE and/or receive a signal sent by the UE.

With reference to the sixth aspect or the first possible implementation of the sixth aspect or the second possible implementation of the sixth aspect, in a fourth possible implementation, the transceiver receives, according to a first carrier hopping pattern, a data signal sent by the first base station; and/or the transceiver sends, according to a second carrier hopping pattern, a data signal to the first base station; and/or the transceiver receives, according to a third carrier hopping pattern, a downlink reference signal sent by the first base station; and/or the transceiver sends, according to a fourth carrier hopping pattern, an uplink reference signal to the first base station.

With reference to the sixth aspect or the first possible implementation of the sixth aspect or the second possible implementation of the sixth aspect, in a fifth possible implementation, the transceiver receives, according to a fifth carrier hopping pattern, a first downlink reference signal sent by the first base station; and/or the transceiver receives, according to a sixth carrier hopping pattern, a second downlink reference signal sent by the first base station.

With reference to the fifth possible implementation of the sixth aspect, in a sixth possible implementation, the transceiver sends, to the first base station, a measurement result obtained according to the first downlink reference signal, where the measurement result includes channel state information CSI; and the transceiver sends, to the first base station, a measurement result obtained according to the second downlink reference signal, where the measurement result includes at least one of reference signal received power RSRP, reference signal received quality RSRQ, and reference signal strength indicator RSSI.

With reference to the sixth aspect or the first possible implementation of the sixth aspect or the second possible implementation of the sixth aspect, in a seventh possible implementation, the transceiver sends, according to a seventh carrier hopping pattern, a first uplink reference signal to the first base station; and/or the transceiver sends, according to an eighth carrier hopping pattern, a second uplink reference signal to the first base station.

With reference to the sixth aspect or the first possible implementation of the sixth aspect or the second possible implementation of the sixth aspect or the third possible implementation of the sixth aspect or the fourth possible implementation of the sixth aspect or the fifth possible implementation of the sixth aspect or the sixth possible implementation of the sixth aspect or the seventh possible implementation of the sixth aspect, in an eighth possible implementation, the transceiver receives all or part of the carrier hopping patterns sent by the first base station; or the transceiver receives part of or an entire of one carrier hopping pattern sent by the first base station.

With reference to the eighth possible implementation of the sixth aspect, in a ninth possible implementation, the transceiver receives a carrier hopping pattern used when serving the UE from the first base station.

With reference to the ninth possible implementation of the sixth aspect, in a tenth possible implementation, the transceiver receives part or all of the carrier hopping pattern used when serving the UE from the first base station.

With reference to the tenth possible implementation of the sixth aspect, in an eleventh possible implementation, the transceiver receives from the first base station part of or an entire of at least one carrier hopping pattern used by each node or node set among nodes serving the UE when serving the UE; and/or the transceiver receives from the first base station information about nodes serving the UE and part of or an entire of at least one carrier hopping pattern used by each node or a node set among the nodes; and/or the transceiver receives from the first base station information about nodes serving the UE and part of or an entire of at least one carrier hopping pattern used by each node or node set among the nodes when serving the UE.

With reference to the sixth aspect or the first possible implementation of the sixth aspect or the second possible implementation of the sixth aspect or the third possible implementation of the sixth aspect or the fourth possible implementation of the sixth aspect or the fifth possible implementation of the sixth aspect or the sixth possible implementation of the sixth aspect or the seventh possible implementation of the sixth aspect or the eighth possible implementation of the sixth aspect or the ninth possible implementation of the sixth aspect or the tenth possible implementation of the sixth aspect or the eleventh possible implementation of the sixth aspect, in a twelfth possible implementation, the user equipment is a user equipment that supports data receiving over only one carrier at the same time.

According to the foregoing solution, a first base station acquires a carrier hopping pattern of a node that performs carrier hopping, and then informs a user equipment UE of carrier configuration information, where the carrier configuration information includes information about activating carrier hopping and/or the carrier hopping pattern, and then the first base station uses, in a corresponding time unit, a carrier corresponding to the time unit to send a signal to the UE or receive a signal from the UE according to the carrier hopping pattern. In this way, when the first base station serves a UE, the first base station may use different carriers in different time units to send a signal to the UE or receive a signal sent by the UE, even if the UE supports data receiving over only one carrier at the same time; and the first base station may select a combination of a time unit, a carrier, and a node used for sending a signal to the UE or receiving a signal sent by the UE, and may select a carrier from a carrier set, in which the number of carriers is greater than the number of carriers supported by the user at any given point of time, to serve the UE, thereby achieving dynamic carrier selection and load adaptive balancing from aspects of both carrier and node and improving system performance.

DETAILED DESCRIPTION OF ILLUSTRATIVE EMBODIMENTS

To make the objectives, technical solutions, and advantages of the present invention more comprehensible, the following further describes the present invention in detail with reference to the accompanying drawings and embodiments. It should be understood that the specific embodiments described herein are merely used for describing the present invention, but are not intended to limit the present invention.

In embodiments of the present invention, a first base station acquires a carrier hopping pattern of a node that performs carrier hopping, and then informs a user equipment UE of carrier configuration information, where the carrier configuration information includes information about activating carrier hopping and/or the carrier hopping pattern; and then according to the carrier hopping pattern, the first base station, when in a corresponding time unit, uses a carrier corresponding to the time unit to send a signal to the UE or receive a signal sent by the UE. In this way, even if the UE supports data receiving over only one carrier at the same time, the first base station may also use different carriers in different time units to send a signal to the UE or receive a signal from the UE when serving the UE, and the first base station may select a combination of a time unit, a carrier, and a node used for sending a signal to the UE or receiving a signal sent by the UE.

The following describes implementation of the present invention in detail with reference to specific embodiments.

Figure 1:
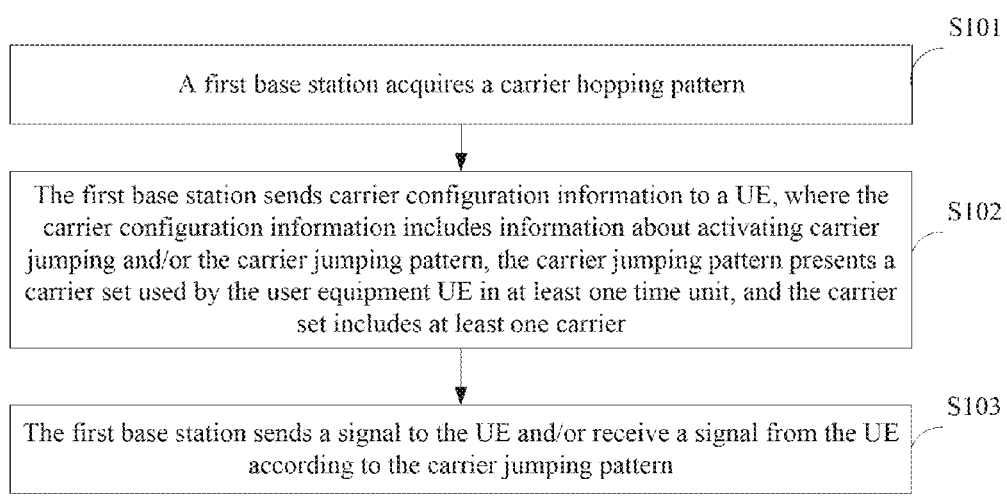
FIG. 1 is an implementation flowchart of a carrier allocation method according to an embodiment of the present invention.

FIG. 1 is an implementation flowchart of a carrier allocation method according to an embodiment of the present invention, as detailed below. In this embodiment, a first base station controlling multiple nodes is used as an example, where the multiple nodes controlled by the first base station may include a macro node and/or a micro node. In a solution of the present invention, the number of nodes controlled by the first base station and the number of nodes that perform carrier hopping may be one or more, which are not limited herein.

In step S101, the first base station acquires a carrier hopping pattern.

In step S102, the first base station sends carrier configuration information to a UE, where the carrier configuration information includes information about activating carrier hopping and/or the carrier hopping pattern, where the carrier hopping pattern presents a carrier set used in at least one time unit by a user equipment UE, and the carrier set includes at least one carrier.

In step S103, the first base station sends a signal to the UE and/or receives a signal from the UE according to the carrier hopping pattern.

According to a preferable embodiment, alternatively, the first base station sends information about activating carrier hopping mode to a UE, and the first base station sends a signal to the UE and/or receives a signal from the UE according to the pre-defined carrier hopping pattern.

According to another preferable embodiment, alternatively, the first base station sends information about activating carrier hopping mode and the carrier hopping pattern acquired in step S101 to a UE, and the first base station sends a signal to the UE and/or receives a signal from the UE according to the carrier hopping pattern.

According to another preferable embodiment, alternatively, the first base station sends the carrier hopping pattern acquired in step S101 to a UE, and the first base station sends a signal to the UE and/or receives a signal from the UE according to the carrier hopping pattern.

According to a preferable embodiment, alternatively, the first base station informs a UE of the acquired carrier hopping pattern in a half-static or a dynamic fashion, for example, informing the UE by using high-layer signaling or physical-layer signaling, where the signaling may be RRC signaling or MAC signaling.

The carrier hopping pattern may be pre-defined during network planning, and may also be determined by a network node, such as the first base station or another network device other than the first base station, and may also be partly pre-defined and partly determined by a network node. For example, carrier hopping patterns of some nodes are pre-defined, carrier hopping patterns of some nodes are determined by the first base station, and carrier hopping patterns of some nodes are determined by another network device other than the first base station; or, part of a carrier hopping pattern of a node is pre-defined, and part of the carrier hopping pattern is determined by the first base station or another network device other than the first base station. In whatever case it may be, determined carrier hopping patterns of nodes are all stored on a network node, such as the first base station or another network device. When the network node, such as the first base station, needs to schedule nodes controlled by itself, the first base station may read a carrier hopping pattern of a node that performs carrier hopping, where the carrier hopping pattern is stored on the first base station; may also acquire, from another network device, a carrier hopping pattern of a node that performs carrier hopping; and then performs a corresponding operation, such as scheduling, on the node according to the carrier hopping pattern.

The pre-defining may be that the pre-defined carrier hopping pattern is associated with a carrier that serves the UE, where the pre-defined carrier hopping pattern is a permutation and a combination of carriers that serve the UE, and the carrier hopping pattern includes index numbers of the carriers, for example, active carrier 1 and active carrier 2. One or more carriers may also be used in each time unit.

For example, a UE is configured with N carriers. When N=2, the carrier hopping pattern may be 0, 1, 0, 1, 0, 1, 0, 1, 0, 1, 000111, 00111101, or the like, where 1 indicates that carrier 1 is used in a time unit for serving the UE, and 0 indicates that carrier 0 is used in a time unit for serving the UE.

When N=3, the carrier hopping pattern may be 012012012012, 000111222, 0022222110, or the like, where 1 indicates that carrier 1 is used in a time unit for serving the UE, 0 indicates that carrier 0 is used for serving the UE in a time unit, and 2 indicates that carrier 2 is used for serving the UE in a time unit.

The carrier hopping pattern may be periodic, and the carrier hopping pattern in each time period is the same until a carrier hopping patterns changes. A carrier hopping pattern of a node presents a carrier set used by the node in each of at least one time unit within a time period to send a signal or receive a signal, and the carrier set includes at least one carrier.

A time period corresponding to the carrier hopping pattern may include at least one time unit. Each time unit may include at least one or more consecutive or non-consecutive subframes or transmission time intervals (Transmission Time Interval, TTI). A carrier hopping pattern corresponding to a node is used to describe a carrier set used in each time unit by the node to send a signal or receive a signal, or is used to determine an active carrier set of the node in each time unit.

Alternatively, in a carrier hopping pattern, each time unit may have a same or different carrier set. Some subframes or TTIs may be restricted from using carrier hopping. Therefore, time units corresponding to a carrier hopping pattern may be consecutive or non-consecutive. A carrier hopping pattern determines only a carrier corresponding to a node on a subframe that performs carrier hopping.

Alternatively, when a UE is informed of a carrier hopping pattern, the UE may be informed of a carrier set used in each time unit in which carrier hopping is performed, where the time unit is within a time period corresponding to the carrier hopping pattern.

Alternatively, when a UE is informed of a carrier hopping pattern, a bitmap may be used for the informing. For example, each bit corresponds to a carrier used in a time unit, 0 indicates that carrier 1 is used, and 1 indicates that carrier 2 is used. Carrier 1 and carrier 2 may be pre-defined or obtained through negotiation between the UE and the first base station.

Alternatively, when a UE is informed of a carrier hopping pattern, the UE may be informed that carrier 1 will be used in time unit set 1 and carrier 2 will be used in time unit set 2. For example, odd subframes are in time unit set 1 and use carrier 1, and even subframes are in time unit set 2 and use carrier 2.

In this embodiment, the first base station may control a node to perform coordination carrier hopping, and according to a carrier hopping pattern acquired by the first base station, the node uses, in different time units, a same or different carriers corresponding to the time units to send a signal to the UE and/or receive a signal sent by the UE.

A node that is specifically selected for the carrier hopping may be determined during network planning or may also be determined by a network node, for example, the first base station. The first base station may select any node among multiple nodes controlled by the first base station as nodes for performing the coordination carrier hopping. The selected node may be a macro node of the first base station, and may also be a micro node covered by the macro node. For example, all micro nodes and macro nodes controlled by the first base station may be selected as nodes for performing the coordination carrier hopping.

Alternatively, the coordination carrier hopping may be performed by some of nodes of the first base station. For example, one or more nodes of the first base station perform coordination carrier hopping, and send a signal to a UE and/or receive a signal from a UE according to a carrier hopping pattern.

Alternatively, some of nodes of the first base station do not perform coordination carrier hopping. For example, at least one node of the first base station does not perform coordination carrier hopping and/or at least one carrier of at least one node of the first base station remains unchanged and does not perform coordination carrier hopping. A carrier of a node that does not perform coordination carrier hopping work as a main carrier to ensure effective coverage for users and serving of legacy UEs. Optionally, on a network, a carrier of a macro node of the first base station may be used as a main carrier of the UE to ensure effective coverage for users and serving of legacy UEs, and the micro node performs coordination carrier hopping to ensure dynamic carrier selection when data is transmitted to the UE.

Figure 2:
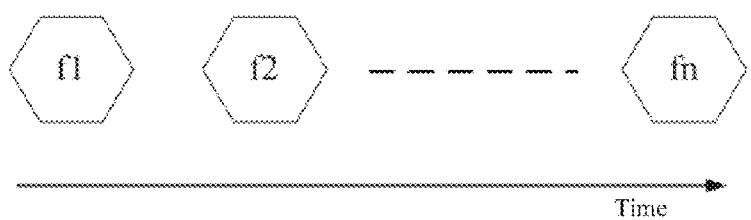
FIG. 2 is a schematic diagram of a carrier hopping pattern of node 1 according to an embodiment of the present invention.

Specifically, a carrier pattern of a node, such as node 1, may be shown in FIG. 2, where f1, f2, to fn indicate carriers used by node 1 in each time unit.

Specifically, carrier hopping patterns of multiple nodes may be as shown in Table 1. The carrier set used by each node except for node 0 is the same, where the carrier of node 0 remains unchanged to ensure effective coverage for users and serving of legacy UEs.

TABLE 1

| Time Unit | Time Unit 1 | Time Unit 2 | Time Unit 3 | Time Unit 4 | Time Unit 5 |
|---|---|---|---|---|---|
| Node 0 | f0 | f0 | f0 | f0 | f0 |
| Node 1 | f1 | f2 | f3 | f4 | f5 |
| Node 2 | f2 | f3 | f4 | f5 | f1 |
| Node 3 | f3 | f4 | f5 | f1 | f2 |

Specifically, carrier sets used by nodes other than node 0 may also be different, as shown in Table 2.

TABLE 2

| Time Unit | Time Unit 1 | Time Unit 2 | Time Unit 3 | Time Unit 4 | Time Unit 5 |
|---|---|---|---|---|---|
| Node 0 | f0 | f0 | f0 | f0 | f0 |
| Node 1 | f1 | f2 | f3 | f4 | f5 |
| Node 2 | f2 | f6 | f4 | f5 | f1 |
| Node 3 | f3 | f4 | f6 | f1 | f2 |

Figure 3:
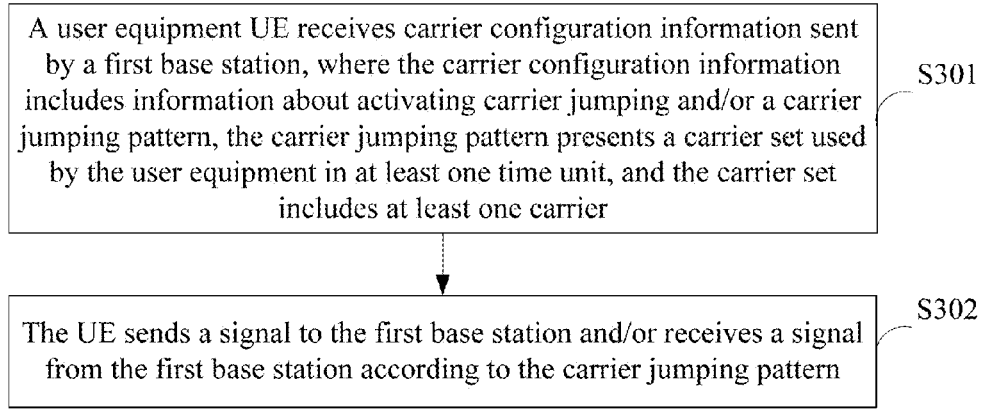
FIG. 3 is an implementation flowchart of another carrier allocation method according to an embodiment of the present invention.
Figure 4:
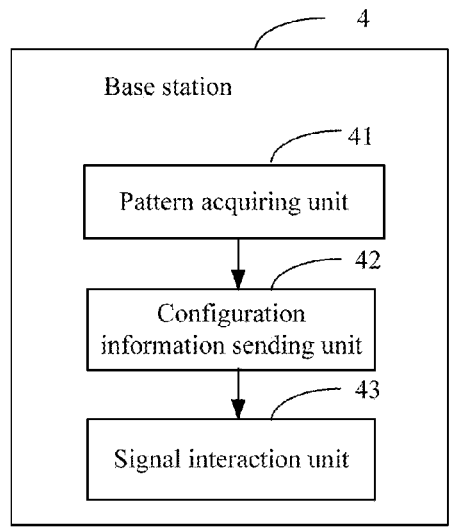
FIG. 4 is a specific structural diagram of a base station according to an embodiment of the present invention.

In addition, each node may use, in a same time unit, two or more than two carriers to receive a signal sent by a UE or send a signal to a UE, and the carrier hopping pattern of each node is shown in FIG. 3 and FIG. 4. In this situation, the carrier hopping pattern informed by the first base station to the UE may be a complete set or a subset of the carrier set used in each time unit by the node.

TABLE 3

| Time Unit | Time Unit 1 | Time Unit 2 | Time Unit 3 | Time Unit 4 | Time Unit 5 |
|---|---|---|---|---|---|
| Node 0 | f0 | f0 | f0 | f0 | f0 |
| Node 1 | f1, f2 | f2, f3 | f3, f4 | f4, f5 | f5, f1 |
| Node 2 | f2, f3 | f3, f4 | f4, f5 | f5, f1 | f1, f2 |
| Node 3 | f3, f4 | f4, f5 | f5, f1 | f1, f2 | f2, f3 |

TABLE 4

| Time Unit | Time Unit 1 | Time Unit 2 | Time Unit 3 | Time Unit 4 | Time Unit 5 |
|---|---|---|---|---|---|
| Node 0 | f0, f6 | f0, f6 | f0, f6 | f0, f6 | f0, f6 |
| Node 1 | f1, f3 | f2, f3, f5 | f3, f4 | f4 | f5 |
| Node 2 | f2, f3, f5 | f3, f4 | f4 | f5 | f1, f3 |
| Node 3 | f3, f4 | f4 | f5 | f1, f3 | f2, f3, f5 |

Alternatively, when a carrier hopping pattern is configured, a same or different carrier hopping patterns may be configured for each node at the same time. In addition, carrier hopping patterns in the uplink and the downlink may be the same or different, that is, the first base station may use a same carrier hopping pattern or different carrier hopping patterns to send a signal to a UE or receive a signal sent by a UE.

According to a preferable embodiment, alternatively, multiple sets of carrier hopping patterns may be defined according to different types of signals received by or sent by the first base station, or multiple sets of carrier hopping patterns may be defined according to different types of signals received by or sent by each node.

Specifically, in this embodiment, a first carrier hopping pattern is defined, and data is sent to a UE according to the first carrier hopping pattern; a second carrier hopping pattern is defined, and data sent by a UE is received according to the second carrier hopping pattern; a third carrier hopping pattern is defined, and a downlink reference signal is sent to a UE according to the third carrier hopping pattern; and, a fourth carrier hopping pattern is defined, and an uplink reference signal sent by a UE is received according to the fourth carrier hopping pattern.

Further, a fifth carrier hopping pattern may further be defined, and a first downlink reference signal is sent to a UE according to the fifth carrier hopping pattern; a sixth carrier hopping pattern is defined, and a second downlink reference signal is sent to a UE according to the sixth carrier hopping pattern, where the first downlink reference signal may be used to measure channel state information CSI, for example, at least one of PMI, RI, CQI, and the like, and the second downlink reference signal may be used to measure at least one of reference signal received power RSRP, reference signal received quality RSRQ, and reference signal strength indicator RSSI.

In addition, the first base station may further receive a measurement result obtained by a UE according to the first downlink reference signal, where the measurement result may include the channel state information CSI; may also receive a measurement result obtained by the UE according to the second downlink reference signal, where the measurement result may include at least one of the reference signal received power RSRP, the reference signal received quality RSRQ, and the reference signal strength indicator RSSI.

Further, the first base station may further define a seventh carrier hopping pattern and receives, according to the seventh carrier hopping pattern, a first uplink reference signal sent by a UE; the first base station may further define an eighth carrier hopping pattern and receives, according to the eighth carrier hopping pattern, a second uplink reference signal sent by a UE, where the first uplink reference signal may be used to measure channel state information, and the second uplink reference signal may be used for demodulation.

In addition, to ensure compatibility, this embodiment may apply to only some of carriers/some of subframes, and other carriers/subframes continue to work in a traditional way, that is, work according to a network plan instead of the carrier hopping.

Alternatively, a node may inform, on a carrier/subframe that does not perform the carrier hopping, a UE of one set or multiple sets of carrier hopping patterns configured for the UE.

In this embodiment, the first base station may independently determine a carrier hopping pattern used by each of multiple selected nodes; may non-independently determine a carrier hopping pattern used by each of multiple selected nodes; or apparently, may also pre-define a carrier hopping pattern used by each node during network planning. The determination in a non-independent manner may be used to ensure that inter-node interference is relatively low or the first base station may select more efficiently a serving node for the UE through coordination among carriers used in each time unit by multiple nodes.

Specifically, the independently determining, by the first base station, a carrier hopping pattern used by each node that participates in the carrier hopping may be implemented by using an algorithm. Specifically, carriers used for carrier hopping performed by a node may be allocated to each time unit according to the number of time units (the number of time units is pre-defined or determined by a network node) in the carrier hopping pattern and according to various preset principles (not limited in the present invention). For example, the number of time units in a period is 5, and the carriers that perform carrier hopping are f1, f2, f3, f4, and f5. Then, the carrier hopping pattern may be determined as {f1, f2, f3, f4, f5}, {f2, f1, f3, f4, f5}, or any other of various carrier combinations. Alternatively, the carrier hopping pattern of the node may be determined according to state information of a channel from a UE served by the node to the node on each carrier. For example, before the carrier hopping, the node sends a reference signal on all carriers and configures a reference signal and/or interference measurement resource for the UE on all carriers, and the UE measures channel state information (CSI) and/or reference signal received power (reference signal received power, RSRP) on all carriers and sends a feedback to the base station. Therefore, the first base station may determine, according to the number of UEs served by the node, service volume of each UE, and CSI and/or RSRP of each UE on each carrier, the number of UEs that need to be served by each carrier and a corresponding UE set (for example, different carriers serve UEs of different sets, and general service volume of UEs served by each carrier is basically the same). Determining a UE set served by a node on each carrier may be determining a set of UEs whose channel directions correspond to a same space angle when served by the node on each carrier, or channel directions of UEs served by the node on different carriers correspond to different space angles, or another case apply. (methods of the independent determination are not limited here). The first base station may determine the number of times that each carrier appears in a carrier hopping pattern according to the service volume of the carrier and then may determine the carrier hopping pattern according to various sequences. A final determination includes a carrier set used by the node in each time unit of a time period. Alternatively, a UE or a UE set that needs to be served by each carrier used in each time unit by the node may further be determined at the same time. There are various methods for independently determining a carrier hopping pattern of each node, which are not limited in the present invention.

Specifically, the determining in a non-independent manner, by the first base station, a carrier hopping pattern used by a node may also be implemented by using an algorithm. Specifically, according to carrier usage of multiple nodes in a time unit, a carrier which allows the UE to suffer from relatively low interference when being served by the node in the time unit is selected as the carrier in the time unit. For example, an efficient way to use nodes and carriers is selected according to carrier usage of multiple nodes in a time unit, and in particular by considering an impact of mutual interference generated when multiple nodes use a same carrier. For example, each node uses different carriers in a same time unit or use different carriers whenever possible, and if different nodes need to use a same carrier in a same time unit, the same carrier is used only on different nodes which are spaced apart by a relatively long distance (for example, a distance longer than a distance threshold), thereby ensuring that a node encounters relatively low interference from other nodes when serving a UE. There are various methods of determining a carrier hopping pattern of each node exist in a non-independent manner, which are not limited in the present invention.

After the coordination carrier hopping is performed, a node may follow a carrier hopping pattern to send and/or receive a reference signal and another signal in at least one time unit on a carrier corresponding to the time unit. Reference signals include a channel state information-reference signal (CSI-RS) and a common reference signal (CRS). If the coordination carrier hopping is used in uplink, the UE sends, according to an uplink carrier hopping pattern, an uplink reference signal in a corresponding time on a corresponding carrier, where the reference signal includes a sounding reference signal (SRS).

According to a preferable embodiment, alternatively, after the first base station determines, according to the carrier hopping pattern, a carrier used in each time unit by each node among at least one node carrier hopping, the first base station uses the corresponding carrier in a corresponding time unit to send a signal and/or receive signal or blanking (blanking indicates that no signal is sent or only control information such as a broadcast is sent while no data signal is sent to any UE).

Specifically, the first base station determines, according to the carrier hopping pattern, a carrier set used in each time unit for sending a signal to the UE, and then uses the corresponding carrier set in the corresponding time unit to send a reference signal and/or a data signal to the UE; and/or the first base station determines, according to the carrier hopping pattern, a carrier or a carrier set used in each time unit for receiving a signal sent by the UE carrier hopping, and then uses the corresponding carrier set in the corresponding time unit to receive a reference signal and/or a data signal sent by the UE.

In this embodiment, the first base station selects a serving node or a serving node set for serving a particular user equipment UE from nodes that perform coordination carrier hopping.

The serving node or the serving node set for serving the UE may be determined according to state information of channels from the UE to multiple nodes on multiple carriers. For example, the first base station may select, according to RSRP/RSRQ which corresponds to each node on the multiple carriers and is fed back by the UE, a combination of a node and a carrier with higher RSRP/RSRQ to serve the UE. Alternatively, select at least one serving node and at least one carrier used by the corresponding serving node. The serving node of the UE may also be a node that does not perform the carrier hopping, for example, a macro node.

According to a preferable embodiment, alternatively, the first base station sends a carrier hopping pattern of a serving node serving the UE or each serving node in a serving node set to the UE, and after receiving the carrier hopping pattern, the UE first measures, according to the received carrier hopping pattern, channel state information (CSI), and then feeds back a measurement result to the first base station.

According to a preferable embodiment, alternatively, the UE may be directly informed of at least one carrier hopping pattern, for example, the UE is informed of at least one of the foregoing eight carrier hopping patterns, where different carrier hopping patterns serve different purposes. Alternatively, the UE may further be informed of part of or an entire of at least one carrier hopping pattern used when the UE is served, for example, the UE is informed of part of or an entire of at least one carrier hopping pattern among the foregoing eight carrier hopping patterns. In this case, the UE does not need to learn information about a node serving the UE, and only needs to perform corresponding measurement, feedback, data sending or receiving according to the received carrier hopping pattern.

Alternatively, the informing the UE of an entire carrier hopping pattern may be that the UE is informed of a Cell-specific or node-specific carrier hopping pattern of a node serving the UE, that is, the UE is informed of all information about the carrier hopping pattern used by the node. In this case, multiple UEs that require this information may be informed in broadcast manner or the UEs may also be informed by using high-layer signaling, DCI signaling, or the like. The informing the UE of part of a carrier hopping pattern may be that the UE is informed of part of a Cell-specific or node-specific carrier hopping pattern of a node, where the part is used for serving the UE, that is, the UE is informed of only carrier hopping information in a time unit related to the UE or information about a carrier used for serving the UE in certain time units in the carrier hopping pattern. In this case, multiple UEs that require this information may also be informed in broadcast manner or the UEs may be informed by using high-layer signaling, DCI signaling, or the like.

When a UE is informed of a carrier hopping pattern, corresponding carrier hopping pattern information may also be informed specifically to each node or node set that serves the UE. For example, the first base station sends, to the UE, part of or an entire of at least one carrier hopping pattern used by each node or node set among nodes serving the UE; and/or the first base station sends, to the UE, part of or an entire of at least one carrier hopping pattern used by each node or node set, among nodes serving the UE, when serving the UE; and/or the first base station sends, to the UE, information about nodes serving the UE and part of or an entire of at least one carrier hopping pattern used by each node or node set among the nodes; and/or the first base station sends, to the UE, information about nodes serving the UE and part of or an entire of at least one carrier hopping pattern used by each node or node set among the nodes when serving the UE.

Specifically, the first base station may inform the UE of carrier hopping patterns of all nodes serving the UE, or may inform the UE of part of carrier hopping patterns of all nodes serving the UE, where the part of carrier hopping patterns may be a combination of a carrier with good channel quality, a node, and time for the UE.

For example, when only one node serves the UE, a carrier hopping pattern used by the node serving the UE is {{f1,f2}, {f3,f4}, {f1,f5}, {f2,f6}, {f2,f3}, and {f5,f6}}, and a carrier hopping pattern informed to the UE is {{f1}, {f3}, {f1}, {f2}, {f2}, and {f5}}. When multiple nodes may serve the UE, the multiple nodes may have different carrier hopping patterns; however, the UE may be informed of part of or an entire carrier hopping pattern of each node, or the UE is directly informed of a carrier hopping pattern which is used for serving the UE, while the node is transparent to the UE.

The UE performs CSI measurement according to the carrier hopping pattern which is used for serving the UE and informed by the first base station, and measures, in each time unit, CSI of a corresponding carrier according to a reference signal on the corresponding carrier. Alternatively, the UE may consider that CSIs measured in a same time unit in all periods of a same carrier hopping pattern correspond to a same or similar channel condition, and may perform statistical processing, such as averaging, on the corresponding CSIs. For CSIs measured in different time units, the UE may not consider that the CSIs correspond to a same or similar channel condition, and consequently may not perform statistical processing such as averaging; or, alternatively, the UE may consider that CSIs measured on a same carrier in all periods of a same carrier hopping pattern correspond to a same or similar channel condition, and may perform statistical processing, such as averaging, on the corresponding CSIs. For CSIs measured on different carriers, the UE may not consider that the CSIs correspond to a same or similar channel condition, and consequently may not perform statistical processing such as averaging.

Reference signals used by the UE for measuring CSI include channel state information-reference signal (CSI-RS) and a common reference signal (CRS), where the reference signals may be from one node or from different nodes. However, the UE does not need to learn whether the reference signals are from different nodes and only measures the CSI according to the reference signal resources.

In this embodiment, the first base station determines, according to a carrier hopping pattern of each serving node among nodes serving the UE or in a serving node set serving the UE, a carrier set that may be used in each time unit by each node, and selects, according to a CSI measurement result fed back by the UE, scheduling information used for transmitting data to the UE, such as time, carrier, and node, and informs the UE of the scheduling information. Alternatively, in the uplink, the first base station selects, according to a measured channel state of the UE and the carrier hopping pattern, scheduling information used for receiving data transmitted by the UE, such as time, carrier, and node, and informs the UE of the scheduling information. The scheduling process may use multiple types of scheduling algorithms, for example, UE priorities in different time and on different carriers are calculated, and resources corresponding to the time and carriers are allocated to a UE with the highest priority.

The first base station may further adjust, according to a feedback from the UE, the carrier hopping pattern for transmitting data to the UE in a half-static or a dynamic fashion and informs the UE of the carrier hopping pattern. For example, a time unit and a carrier which is specific to the UE and exhibits better CSI are selected to transmit data to the UE, however, different carriers may be used at different time to transmit data to the UE or receive data from the UE. The UE uses a corresponding carrier in a corresponding time unit to receive data or send data according to the scheduling information informed by the first base station.

Alternatively, base stations exchange, by using an interface between base stations, such as an X2 interface, carrier hopping patterns used by multiple nodes corresponding to the base stations so as to facilitate carrier coordination between the base stations. For example, a base station which interacts with another base station changes a carrier hopping pattern used by a node corresponding to the base station, so as to decrease inter-node interference among multiple nodes of the base stations.

For example, a second base station includes at least one node, and after the first base station acquires a carrier hopping pattern, the first base station may send a carrier hopping pattern used by a node of the first base station to the second base station, and the first base station may further receive a carrier hopping pattern which is used by a node of the second base station and sent by the second base station.

For example:

1. A carrier of a macro cell serves as a main carrier of a UE and is not used for carrier hopping, so as to ensure valid coverage for users and coverage for legacy UEs.

2. Carriers of multiple micro cells in the macro cell perform carrier hopping.
   (1) A carrier hopping pattern of each micro cell is determined in an independent or non-independent manner (good coordination between carriers in different micro cells at each time moment is ensured), and then the UE is informed of carrier hopping patterns of all micro cells in a coordinative micro cell set of the UE.
   (2) A carrier hopping pattern of each micro cell includes a carrier or carrier set used by a corresponding node in each time period (for example, N TTI, N≥1).
   (3) The UE measures, according to a carrier hopping pattern which is used by each micro cell and informed by the first base station, a channel of a corresponding micro cell corresponding to a carrier and feeds back a measurement result, and receives data from the corresponding cell on the corresponding carrier according to scheduling information.
   (4) The first base station dynamically selects, according to the feedback from the UE, a carrier for serving the UE and uses, in a corresponding time unit, a carrier corresponding to the time unit to transmit data to the UE.

It should be noted that, to ensure compatibility, the solution of the present invention may apply to only some of carriers/some of subframes, and other carriers continue to work in a traditional way, that is, work according to a network plan instead of carrier hopping. For example, at least one planned carrier is used for coverage for legacy UEs and the like.

Further, all cells including micro cells or the main serving cell of the UE perform coordination carrier hopping.

According to a preferable embodiment, alternatively, the UE is notified of a new carrier hopping carrier pattern before a current carrier hopping pattern is changed, and the new carrier hopping pattern is put into use at a pre-defined time or at a notified time.

According to a preferable embodiment, alternatively, the UE is informed of information about all carriers that may be used for serving the UE, or the UE is informed of information about all carriers that may be used by each node among nodes serving the UE.

According to a preferable embodiment, alternatively, the UE according to the present invention may be a user equipment that supports data receiving over only one carrier at the same time.

In this embodiment, a first base station first acquires a carrier hopping pattern of a node that performs carrier hopping, and then informs a user equipment UE of information about activating carrier hopping and/or the carrier hopping pattern; and then according to the carrier hopping pattern, at least one node of the first base station sends a signal to the UE or receives a signal from the UE in a corresponding time unit and on a carrier corresponding to the time unit carrier hopping. In this way, when the first base station serves a UE, even if the UE supports data receiving over only one carrier at the same time, the first base station may use different carriers in different time units to send a signal to the UE or receive a signal sent by the UE; and the first base station may select a combination of a time unit, a carrier, and a node used for sending a signal to the UE or receiving a signal sent by the UE, and may select a carrier from a carrier set, in which the number of carriers is greater than the number of carriers supported by the user at any given point of time, to serve the UE, thereby achieving dynamic carrier selection and adaptive load balancing from aspects of both carrier and node and improving system performance.

FIG. 3 is a flowchart of implementing another carrier allocation method according to an embodiment of the present invention. A UE side is used as an example for description, as detailed below.

In step S301, a user equipment UE receives carrier configuration information sent by a first base station, where the carrier configuration information includes information about activating carrier hopping mode and/or a carrier hopping pattern, the carrier hopping pattern presents a carrier set used by the user equipment in at least one time unit, and the carrier set includes at least one carrier.

In step S302, the UE sends a signal to the first base station and/or receives a signal from the first base station according to the carrier hopping pattern.

According to a preferable embodiment, alternatively, the UE receives from the first base station the information about activating carrier hopping mode, and sends a signal to the first base station and/or receives a signal from the first base station according to a pre-defined carrier hopping pattern.

According to another preferable embodiment, alternatively, the UE receives from the first base station the information about activating carrier hopping mode and the carrier hopping pattern acquired by the first base station, and sends a signal to the first base station and/or receives a signal from the first base station according to the carrier hopping pattern.

According to another preferable embodiment, alternatively, the UE receives the carrier hopping pattern which is used by the first base station and sent by the first base station, and sends a signal to the first base station and/or receives a signal from the first base station according to the carrier hopping pattern, where the carrier hopping pattern is pre-defined.

According to a preferable embodiment, alternatively, the UE may receive, in a half-static or a dynamic fashion, the carrier hopping pattern sent by the first base station, for example, receive, by using high-layer signaling or physical-layer signal, information about the carrier hopping pattern sent by the first base station, where the signaling may be RRC signaling or MAC signaling.

The pre-defining may be that the pre-defined carrier hopping pattern is associated with a carrier that serves the UE, where the pre-defined carrier hopping pattern is a permutation and a combination of carriers that serve the UE, and the carrier hopping pattern includes index numbers of the carriers, for example, active carrier 1 and active carrier 2. One or more carriers may also be used in each time unit.

For example, a UE is configured with N carriers. When N=2, the carrier hopping pattern may be 0, 1, 0, 1, 0, 1, 0, 1, 0, 1, 000111, 00111101, or the like, where 1 indicates that carrier 1 is used in a time unit for serving the UE, and 0 indicates that carrier 0 is used in a time unit for serving the UE.

When N=3, the carrier hopping pattern may be 012012012012, 000111222, 0022222110, or the like, where 1 indicates that carrier 1 is used in a time unit for serving the UE, 0 indicates that carrier 0 is used in a time unit for serving the UE, and 2 indicates that carrier 2 is used in a time unit for serving the UE.

A time period corresponding to the carrier hopping pattern may include at least one time unit. Each time unit may include at least one or more consecutive or non-consecutive subframes or transmission time intervals (Transmission Time Interval, TTI).

Alternatively, in a carrier hopping pattern, each time unit may have a same or different carrier or carrier set. Some subframes or TTIs may be restricted from using carrier hopping. Therefore, time units corresponding to a carrier hopping pattern may be consecutive or non-consecutive. A carrier hopping pattern determines only a carrier corresponding to a node on a subframe that performs carrier hopping.

Alternatively, when the UE is informed of a carrier hopping pattern, the UE may be informed of a carrier or a carrier set used in each time unit for carrier hopping within a time period corresponding to the carrier hopping pattern.

Alternatively, when the UE is informed of the carrier hopping pattern, a bitmap may be used for the informing. For example, each bit corresponds to a carrier used in a time unit, 0 indicates that carrier 1 is used, and 1 indicates that carrier 2 is used. Carrier 1 and carrier 2 may be pre-defined or obtained through negotiation between the UE and the first base station.

Alternatively, when the UE is informed of a carrier hopping pattern, the UE may be informed that time unit set 1 uses carrier 1 and time unit set 2 uses carrier 2. For example, odd subframes are in time unit set 1 and use carrier 1, and even subframes are in time unit set 2 and use carrier 2.

The carrier hopping pattern is used to indicate a carrier set used by a UE for sending a signal to the first base station and/or receiving a signal from the first base station in at least one time unit within a period of the carrier hopping pattern; and the carrier hopping pattern may further be used to indicate a carrier set used by a UE for sending a signal to at least one node of the first base station and/or receiving a signal from at least one node of the first base station in at least one time unit within the period of the carrier hopping pattern.

Further, the UE may receive all or part of the carrier hopping patterns sent by the first base station, and may further receive part of or an entire of one carrier hopping pattern sent by the first base station.

When receiving part of the carrier hopping patterns sent by the first base station, the UE receives only the carrier hopping patterns that are used when serving the UE and sent by the first base station, specifically, may receive from the first base station part or all of carrier hopping patterns used when serving the UE from the first base station.

Specifically, the receiving, by the UE, part or an entire of a carrier hopping pattern which is used when serving the UE and sent by the first base station includes receiving, by the UE, part of or an entire of at least one carrier hopping pattern which is sent by the first base station and is used by each node or node set, among nodes serving the UE, when serving the UE; and/or receiving, by the UE, information about nodes serving the UE and part of or an entire of at least one carrier hopping pattern which is used by each node or node set among the nodes, where the information about nodes serving the UE and the part of or the entire of at least one carrier hopping pattern are sent by the first base station; and/or receiving, by the UE, information about nodes serving the UE and part of or an entire of at least one carrier hopping pattern used by each node or node set among the nodes when serving the UE, where the information about nodes serving the UE and the part of or the entire of at least one carrier hopping pattern are sent by from the first base station.

It should be noted that, the uplink and downlink may have a same or different carrier hopping pattern, that is, the UE may use a same carrier hopping pattern or different carrier hopping patterns to send a signal to the first base station or receive a signal sent by the first base station.

According to a preferable embodiment, alternatively, multiple sets of carrier hopping patterns may be defined according to different types of signals received by or sent by the UE, or multiple sets of carrier hopping patterns may be defined according to different types of signals received by the UE from each node or sent by the UE.

In this embodiment of the present invention, carrier hopping the UE receives, according to a first carrier hopping pattern, a data signal sent by the first base station; and/or, the UE sends, according to a second carrier hopping pattern, a data signal to the first base station; and/or, the UE receives, according to a third carrier hopping pattern, a downlink reference signal sent by the first base station; and/or, the UE sends, according to a fourth carrier hopping pattern, an uplink reference signal to the first base station. The carrier hopping patterns used by the UE correspond to the carrier hopping patterns used on the first base station side to receive and send a signal as described in embodiment 1.

Further, the UE may further receive, according to a fifth carrier hopping pattern, a first downlink reference signal sent by the first base station, and may further receive, according to a sixth carrier hopping pattern, a second downlink reference signal sent by the first base station.

Further, after the UE receives, according to the fifth carrier hopping pattern, the first downlink reference signal sent by the first base station, the UE further sends, to the first base station, a measurement result obtained according to the first downlink reference signal, where the measurement result includes channel state information CSI, and the measurement result may be sent carrier hopping to the first base station according to the fifth carrier hopping pattern. Further, after the UE receives, according to the sixth carrier hopping pattern, the second downlink reference signal sent by the first base station, the UE sends, to the first base station, a measurement result obtained according to the second downlink reference signal, where the measurement result includes at least one of reference signal received power RSRP, reference signal received quality RSRQ, and a reference signal strength indicator RSSI, and the measurement result may be sent carrier hopping to the first base station according to the sixth carrier hopping pattern.

Further, the UE may further send carrier hopping a first uplink reference signal to the first base station according to a seventh carrier hopping pattern, and may further send carrier hopping a second uplink reference signal to the first base station according to an eighth carrier hopping pattern.

In addition, to ensure compatibility, this embodiment may apply to only some of carriers/some of subframes, and other carriers/subframes continue to work in a traditional way, that is, work according to a network plan instead of carrier hopping.

Alternatively, a node may inform, on a carrier/subframe that does not perform the carrier hopping, a UE of one set or multiple sets of carrier hopping patterns configured for the UE.

The UE determines, according to the carrier hopping pattern, a carrier set used for receiving a signal in each time unit sent by the first base station, and uses a corresponding carrier set in a corresponding time unit to receive a reference signal and/or a data signal sent by the first base station; and/or the UE determines, according to the carrier hopping pattern, a carrier set used for sending in each time unit a signal to the first base station, and then uses a corresponding carrier set in a corresponding time unit to send a reference signal and/or a data signal to the first base station.

According to a preferable embodiment, alternatively, the UE receives at least one carrier hopping pattern sent by the first base station, where different carrier hopping patterns serve different purposes, for example, the UE is informed of at least one of the foregoing eight carrier hopping patterns. Alternatively, the UE further receives from the first base station part of or an entire of at least one carrier hopping pattern used when serving the UE from the first base station, for example, the UE receives part of or an entire of at least one carrier hopping pattern among the foregoing eight carrier hopping patterns. In this case, the UE does not need to learn information about nodes serving the UE, and only needs to perform corresponding measurement, feedback, data sending or receiving according to the received carrier hopping pattern.

Alternatively, an entire carrier hopping pattern received by the UE from the first base station may be a Cell-specific or node-specific carrier hopping pattern of a node serving the UE, where the Cell-specific or node-specific carrier hopping pattern is sent by the first base station. That is, the UE is informed of all information about the carrier hopping pattern used by the node. In this case, the UE obtains corresponding information by receiving broadcasting signaling, or by receiving high-layer signaling or DCI signaling. Part of a carrier hopping pattern received by the UE from the first base station may be a part of a Cell-specific or node-specific carrier hopping pattern of a node serving the UE, where the Cell-specific or node-specific carrier hopping pattern is sent by the first base station. That is, the information received by the UE includes only carrier hopping information of a time unit related to the UE in the carrier hopping pattern or information about a carrier used when the UE is served in certain time units. In this case, the UE may receive the information by receiving broadcast signaling, high-layer signaling, DCI signaling, or the like.

The UE performs CSI measurement according to the carrier hopping pattern which is used to serve the UE and informed by the first base station, and measures CSI of the corresponding carrier in each time unit according to a reference signal on the corresponding carrier. Alternatively, the UE may consider that CSIs measured in a same time unit in all periods of a same carrier hopping pattern correspond to a same or similar channel condition, and may perform statistical processing, such as averaging, on the corresponding CSIs. For CSIs measured in different time units, the UE may not consider that the CSIs correspond to a same or similar channel condition, and consequently may not perform statistical processing such as averaging; or, alternatively, the UE may consider that CSIs measured on a same carrier in all periods of a same carrier hopping pattern correspond to a same or similar channel condition, and may perform statistical processing, such as averaging, on the corresponding CSIs. For CSI measured on different carriers, the UE may not consider that the CSIs correspond to a same or similar channel condition, and consequently may not perform statistical processing such as averaging.

Reference signals used by the UE for measuring CSI include a channel state information-reference signal (CSI-RS) and a common reference signal (CRS), where reference signals may be from one node or from different nodes, but the UE does not need to learn whether the reference signals are from different nodes and may only measure CSI according to the reference signal resources.

According to a preferable embodiment, alternatively, the UE receives a new carrier hopping carrier notified by the first base station before a current carrier hopping pattern is changed, and the new carrier hopping pattern is activated at a pre-defined time or at a notified time.

According to a preferable embodiment, alternatively, the UE receives from the first base station information about all carriers that may be used for serving the UE or information about all carriers that may be used by each node among nodes serving the UE.

According to a preferable embodiment, alternatively, the UE according to the present invention may be a user equipment that supports data receiving over only one carrier at the same time.

In this embodiment, a user equipment UE receives information about activating a carrier hopping mode and/or a carrier hopping pattern, and sends a signal to a first base station and/or receives a signal from the first base station according to the carrier hopping pattern. In this way, when the first base station serves a UE, the first base station may use different carriers in different time units to send a signal to the UE or receive a signal sent by the UE, even if the UE supports data receiving over only one carrier at the same time; and the first base station may select a combination of a time unit, a carrier, and a node used for sending a signal to the UE or receiving a signal sent by the UE, and may select a carrier used for serving the UE from a carrier set in which the number of carriers is greater than the number of carriers supported by the user at any given point of time, thereby achieving dynamic carrier selection and load adaptive balancing from aspects of both carrier and node and improving system performance.

The base station side in this embodiment corresponds to the base station in embodiment 1. The base station side has been described in detail in embodiment 1. Therefore, for details about the UE side, refer to embodiment 1. No further details are provided herein.

FIG. 4 is a structural block diagram of a base station according to an embodiment of the present invention. For ease of description, only part related to this embodiment of the present invention is illustrated. The base station 4 is configured to implement the carrier allocation method in the foregoing embodiments, and the base station 4 includes a pattern acquiring unit 41, a configuration information sending unit 42, and a signal interaction unit 43.

The pattern acquiring unit 41 is configured to acquire a carrier hopping pattern.

The configuration information sending unit 42 is configured to send carrier configuration information to a user equipment UE, where the carrier configuration information includes information about activating carrier hopping and/or the carrier hopping pattern, the carrier hopping pattern presents a carrier set used by a user equipment in at least one time unit, and the carrier set includes at least one carrier.

The signal interaction unit 43 is configured to send a signal to the UE and/or receive a signal from the UE according to the carrier hopping pattern.

Further, the signal interaction unit 43 sends, through at least one node of the base station, a signal to the UE and/or receives a signal from the UE in a time unit determined by the carrier hopping pattern and on a carrier corresponding to the time unit.

Further, the pattern acquiring unit 41 includes a first pattern acquiring module, configured to acquire a pre-configured carrier hopping pattern; and/or a second pattern acquiring module, configured to acquire a carrier hopping pattern determined by the base station or determined by another network device.

Further, the carrier hopping pattern is used to indicate a carrier set used by at least one node of a first base station in at least one time unit within a period of the carrier hopping pattern to send a signal to the UE and/or receive a signal sent by the UE.

Further, the signal interaction unit 43 includes a data signal sending module, configured to send, according to a first carrier hopping pattern, a data signal to the UE; and/or a data signal receiving module, configured to receive, according to a second carrier hopping pattern, a data signal sent by the UE; and/or a downlink reference signal sending module, configured to send, according to a third carrier hopping pattern, a downlink reference signal to the UE; and/or an uplink reference signal sending module, configured to receive, according to a fourth carrier hopping pattern, an uplink reference signal sent by the UE.

Further, the signal interaction unit 43 further includes a first downlink reference signal receiving module, configured to send, according to a fifth carrier hopping pattern, a first downlink reference signal to the UE; and/or a second downlink reference signal sending module, configured to send, according to a sixth carrier hopping pattern, a second downlink reference signal to the UE.

Further, the signal interaction unit 43 further includes a first measurement result receiving module, configured to receive a measurement result obtained by the UE according to the first downlink reference signal, where the measurement result includes channel state information CSI; and a second measurement result receiving module, configured to receive a measurement result obtained by the UE according to the second downlink reference signal, where the measurement result includes at least one of reference signal received power RSRP, reference signal received quality RSRQ, and reference signal strength indicator RSSI.

Further, the signal interaction unit 43 further includes a first uplink reference signal receiving module, configured to receive, according to a seventh carrier hopping pattern, a first uplink reference signal sent by the UE; and/or a second uplink reference signal receiving module, configured to receive, according to an eighth carrier hopping pattern, a second uplink reference signal sent by the UE.

Further, the configuration information sending unit 42 includes a first configuration information sending module, configured to send all or part of the carrier hopping patterns to the UE; or a second configuration information sending module, configured to send part of or an entire of one carrier hopping pattern to the UE.

Further, the first configuration information sending module sends, to the UE, a carrier hopping pattern used when serving the UE.

Further, the first configuration information sending module sends, to the UE, part of or an entire of one carrier hopping pattern used when serving the UE.

Further, the first configuration information sending module includes a first sending submodule, configured to send, to the UE, part of or an entire of at least one carrier hopping pattern used by each node or node set, among nodes serving the UE, when serving the UE; and/or a second sending submodule, configured to send, to the UE, information about nodes serving the UE and part of or an entire of at least one carrier hopping pattern used by each node or node set among the nodes; and/or a third sending submodule, configured to send, to the UE, information about nodes serving the UE and part of or an entire of at least one carrier hopping pattern used by each node or node set among the nodes when serving the UE.

Further, at least one node of the base station does not perform coordination carrier hopping; and/or at least one carrier of at least one node of the base station does not perform coordination carrier hopping.

Further, a second base station includes at least one node, and the first base station further includes a carrier pattern sending unit, configured to send, to the second base station, a carrier hopping pattern used by a node of the first base station; and/or a carrier pattern receiving unit, configured to receive a carrier hopping pattern which is used by a node of the second base station and is sent by the second base station.

Further, the user equipment is a user equipment that supports data receiving over only one carrier at the same time.

When the base station according to this embodiment of the present invention serves a UE, the base station may also use different carriers in different time units to send a signal to the UE or receive a signal sent by the UE, even if the UE supports data receiving over only one carrier at the same time. A combination of a time unit, a carrier, and a node used for sending a signal to the UE or receiving a signal sent by the UE may be selected and a carrier in a carrier set in which the number of carriers is greater than the number of carriers supported by a user at any given point of time may be selected to serve the UE, therefore achieving dynamic carrier selection and load adaptive balancing from aspects of both carrier and node and improving system performance.

Figure 5:
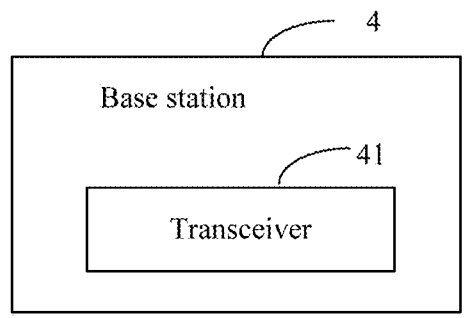
FIG. 5 is a specific structural diagram of another base station according to an embodiment of the present invention.

FIG. 5 is a structural block diagram of another base station according to an embodiment of the present invention. For ease of description, only part related to this embodiment of the present invention is illustrated. A base station 5 is configured to implement the carrier allocation method in the foregoing embodiments, and the base station 5 includes a transceiver 51. The transceiver 51 is configured to acquire a carrier hopping pattern; is further configured to send carrier configuration information to a user equipment UE, where the carrier configuration information includes information about activating carrier hopping and/or the carrier hopping pattern, the carrier hopping pattern presents a carrier set used by the user equipment in at least one time unit, and the carrier set includes at least one carrier; and is further configured to send a signal to the UE and/or receive a signal from the UE according to the carrier hopping pattern.

Further, the transceiver 51 sends a signal to the UE and/or receives a signal from the UE through at least one node of the base station in a time unit determined by the carrier hopping pattern and on a carrier corresponding to the time unit.

Further, the transceiver 51 acquires a pre-configured carrier hopping pattern; and/or the transceiver 51 acquires a carrier hopping pattern determined by the base station or determined by another network device.

Further, the carrier hopping pattern is used to indicate a carrier set used by at least one node of the first base station in at least one time unit within a period of the carrier hopping pattern to send a signal to the UE and/or receive a signal sent by the UE.

Further, the transceiver 51 sends, according to a first carrier hopping pattern, a data signal to the UE; and/or the transceiver 51 receives, according to a second carrier hopping pattern, a data signal sent by the UE; and/or the transceiver 51 sends, according to a third carrier hopping pattern, a downlink reference signal to the UE; and/or the transceiver 51 receives, according to a fourth carrier hopping pattern, an uplink reference signal sent by the UE.

Further, the transceiver 51 sends, according to a fifth carrier hopping pattern, a first downlink reference signal to the UE; and/or the transceiver 51 sends, according to a sixth carrier hopping pattern, a second downlink reference signal to the UE.

Further, the transceiver 51 receives a measurement result obtained by the UE according to the first downlink reference signal, where the measurement result includes channel state information CSI; and the transceiver 51 receives a measurement result obtained by the UE according to the second downlink reference signal, where the measurement result includes at least one of reference signal received power RSRP, reference signal received quality RSRQ, and reference signal strength indicator RSSI.

Further, the transceiver 51 receives, according to a seventh carrier hopping pattern, a first uplink reference signal sent by the UE; and/or the transceiver 51 receives, according to an eighth carrier hopping pattern, a second uplink reference signal sent by the UE.

Further, the transceiver 51 sends all or part of the carrier hopping patterns to the UE; or the transceiver 51 sends part of or an entire of one carrier hopping pattern to the UE.

Further, the transceiver 51 sends, to the UE, the carrier hopping pattern used when serving the UE.

Further, the transceiver 51 sends, to the UE, part of or an entire of one carrier hopping pattern used when serving the UE.

Further, the transceiver 51 sends, to the UE, part of or an entire of at least one carrier hopping pattern used by each node or node set, among nodes serving the UE, when serving the UE; and/or the transceiver 51 sends, to the UE, information about nodes serving the UE and part of or an entire of at least one carrier hopping pattern used by each node or node set among the nodes; and/or the transceiver 51 send, to the UE, information about nodes serving the UE and part of or an entire of at least one carrier hopping pattern used by each node or node set among the nodes when serving the UE.

Further, at least one node of the base station does not perform coordination carrier hopping; and/or at least one carrier of at least one node of the base station does not perform coordination carrier hopping.

Further, a second base station includes at least one node, and the transceiver 51 sends a carrier hopping pattern used by a node of the first base station to the second base station; and/or the transceiver 51 receives a carrier hopping pattern which is used by a node of the second base station and is sent by the second base station.

Further, the user equipment is a user equipment that supports data receiving over only one carrier at the same time.

Figure 6:
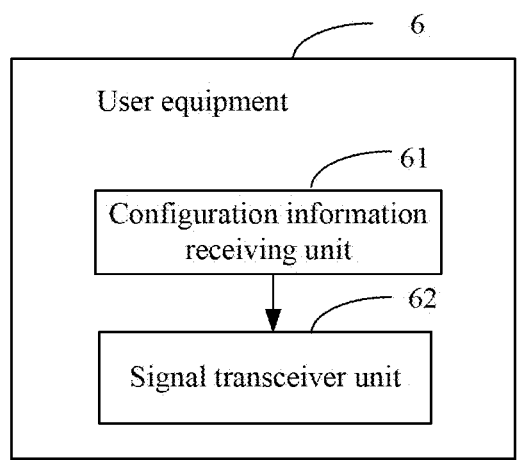
FIG. 6 is a specific structural diagram of a user equipment according to an embodiment of the present invention.

FIG. 6 is a structural block diagram of a user equipment according to an embodiment of the present invention. For ease of description, only part related to this embodiment of the present invention is illustrated. A user equipment 6 is configured to implement the carrier allocation method in the foregoing embodiments, and the user equipment 6 includes a configuration information receiving unit 61 and a signal transceiver unit 62.

The configuration information receiving unit 61 is configured to receive carrier configuration information sent by a first base station, where the carrier configuration information includes information about activating carrier hopping and/or a carrier hopping pattern, the carrier hopping pattern presents a carrier set used by the user equipment in at least one time unit, and the carrier set includes at least one carrier.

The signal transceiver unit 62 is configured to send a signal to the first base station and/or receive a signal from the first base station according to the carrier hopping pattern.

Further, the signal transceiver unit 62 receives a signal from at least one node of the first base station and/or sends a signal to at least one node of the first base station in a time unit determined by the carrier hopping pattern and on a carrier corresponding to the time unit.

Further, the carrier hopping pattern is pre-configured; and/or the carrier hopping pattern is determined by the first base station or another network device.

Further, the carrier hopping pattern is used to indicate a carrier set used by the UE in at least one time unit within a period of the carrier hopping pattern to send a signal to at least one node of the first base station and/or receive a signal sent by at least one node of the first base station.

Further, the signal transceiver unit 62 includes a data signal receiving module, configured to receive, according to a first carrier hopping pattern, a data signal sent by the first base station; and/or a data signal sending module, configured to send, according to a second carrier hopping pattern, a data signal to the first base station; and/or a downlink reference signal receiving module, configured to receive, according to a third carrier hopping pattern, a downlink reference signal sent by the first base station; and/or an uplink reference signal sending module, configured to send, according to a fourth carrier hopping pattern, an uplink reference signal to the first base station.

Further, the signal transceiver unit 62 includes a first downlink reference signal receiving module, configured to receive, according to a fifth carrier hopping pattern, a first downlink reference signal sent by the first base station; and/or a second downlink reference signal receiving module, configured to receive, according to a sixth carrier hopping pattern, a second downlink reference signal sent by the first base station.

Further, the signal transceiver unit 62 further includes a first measurement result sending module, configured to send, to the first base station, a measurement result obtained according to the first downlink reference signal, where the measurement result includes channel state information CSI; and a second measurement result sending module, configured to send, to the first base station, a measurement result obtained according to the second downlink reference signal, where the measurement result includes at least one of reference signal received power RSRP, reference signal received quality RSRQ, and reference signal strength indicator RSSI.

Further, the signal transceiver unit 62 further includes a first uplink reference signal sending module, configured to send, according to a seventh carrier hopping pattern, a first uplink reference signal to the first base station; and/or a second uplink reference signal sending module, configured to send, according to an eighth carrier hopping pattern, a second uplink reference signal to the first base station.

Further, the configuration information receiving unit 61 includes a first carrier pattern receiving module, configured to receive all or part of the carrier hopping patterns sent by the first base station; or a second carrier pattern receiving module, configured to receive part of or an entire of one carrier hopping pattern sent by the first base station.

Further, the first carrier pattern receiving module receives from the first base station a carrier hopping pattern used when serving the UE from the first base station.

Further, the first carrier pattern receiving module receives from the first base station part of or an entire of a carrier hopping pattern used when serving the UE from the first base station.

Further, the first carrier pattern receiving module receives part of or an entire of at least one carrier hopping pattern used by each node or node set, among nodes serving the UE, when serving the UE; and/or receives from the first base station information about nodes serving the UE and part of or an entire of at least one carrier hopping pattern used by each node or node set among the nodes; and/or receives from the first base station information about nodes serving the UE and part of or an entire of at least one carrier hopping pattern used by each node or node set among the nodes when serving the UE.

Further, the user equipment 6 is a user equipment that supports data receiving over only one carrier at the same time.

Figure 7:
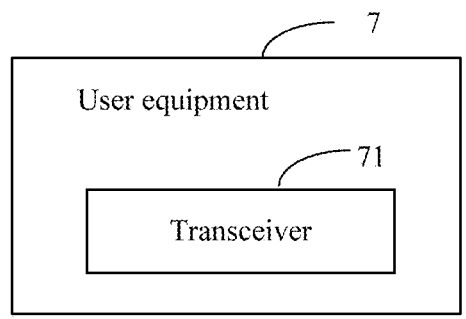
FIG. 7 is a specific structural diagram of another user equipment according to an embodiment of the present invention.

FIG. 7 is a structural block diagram of another user equipment according to an embodiment of the present invention. For ease of description, only part related to this embodiment of the present invention is illustrated. A user equipment 7 is configured to implement the carrier allocation method in the foregoing embodiments, and the user equipment 7 includes a transceiver 71. The transceiver 71 is configured to receive carrier configuration information sent by a first base station, where the carrier configuration information includes information about activating carrier hopping and/or a carrier hopping pattern, the carrier hopping pattern presents a carrier set used by a user equipment in at least one time unit, and the carrier set includes at least one carrier; and is further configured to send a signal to the first base station and/or receive a signal from the first base station according to the carrier hopping pattern.

Further, the transceiver 71 receives a signal from at least one node of the first base station and/or sends a signal to at least one node of the first base station in a time unit determined by the carrier hopping pattern and on a carrier corresponding to the time unit.

Further, the carrier hopping pattern is pre-configured; and/or the carrier hopping pattern is determined by the first base station or another network device.

Further, the carrier hopping pattern is used to indicate a carrier set used by the UE in at least one time unit within a period of the carrier hopping pattern to send a signal to at least one node of the first base station and/or receive a signal sent by at least one node of the first base station.

Further, the transceiver 71 receives, according to a first carrier hopping pattern, a data signal sent by the first base station; and/or the transceiver 71 sends, according to a second carrier hopping pattern, a data signal to the first base station; and/or the transceiver 71 receives, according to a third carrier hopping pattern, a downlink reference signal sent by the first base station; and/or the transceiver sends 71, according to a fourth carrier hopping pattern, an uplink reference signal to the first base station.

Further, the transceiver 71 receives, according to a fifth carrier hopping pattern, a first downlink reference signal sent by the first base station; and/or the transceiver 71 receives, according to a sixth carrier hopping pattern, a second downlink reference signal sent by the first base station.

Further, the transceiver 71 sends, to the first base station, a measurement result obtained according to the first downlink reference signal. The measurement result includes channel state information CSI. The transceiver 71 sends, to the first base station, a measurement result obtained according to the second downlink reference signal, where the measurement result includes at least one of reference signal received power RSRP, reference signal received quality RSRQ, and reference signal strength indicator RSSI.

Further, the transceiver 71 sends, according to a seventh carrier hopping pattern, a first uplink reference signal to the first base station; and/or the transceiver 71 sends, according to an eighth carrier hopping pattern, a second uplink reference signal to the first base station.

Further, the transceiver 71 receives all or part of the carrier hopping patterns sent by the first base station; or the transceiver 71 receives part of or an entire of one carrier hopping pattern sent by the first base station.

Further, the transceiver 71 receives from the first base station a carrier hopping pattern used when serving the UE from the first base station.

Further, the transceiver 71 receives from the first base station part of or an entire of a carrier hopping pattern used when serving the UE from the first base station.

Further, the transceiver 71 receives from the first base station part of or an entire of at least one carrier hopping pattern which is used by each node or node set among nodes serving the UE when serving the UE; and/or the transceiver 71 receives from the first base station information about nodes serving the UE and part of or an entire of at least one carrier hopping pattern which is used by each node or a node set among the nodes; and/or the transceiver 71 receives from the first base station information about nodes serving the UE and part of or an entire of at least one carrier hopping pattern which is used by each node or node set among the nodes when serving the UE.

Further, the user equipment 7 is a user equipment that supports data receiving over only one carrier at the same time.

The node in the present invention may be a cell, a node set, or a cell set. The method and apparatus in the present invention are also applicable when the node in the present invention is replaced with a cell, a node set, or a cell set.

In the present invention, serving a UE may include sending a signal to the UE and/or receiving a signal sent by the UE, where the signal includes any signal transmitted between the UE and a base station or between nodes of a base station, such as a reference signal and a data signal.

In the present invention, using a carrier to send a signal and/or receive a signal may include scrambling and/or descrambling a corresponding signal by using a cell ID (Identity, identity) corresponding to the carrier.

It is worth noting that in the foregoing system embodiments, the units included in the system are categorized merely by functional logic, but the units may be categorized in another manner provided that units can implement the corresponding functions; in addition, specific names of the functional units are merely intended to distinguish them from each other, and are not intended to limit the scope of protection of the present invention.

A person skilled in the art may understand that all or part of the steps in the foregoing embodiments may be performed by a program instructing relevant hardware. The program may be stored in a computer-readable storage medium such as a ROM/RAM, a magnetic disk, or an optical disc.

The foregoing descriptions are merely exemplary embodiments of the present invention, but are not intended to limit the present invention. Any modifications, equivalent replacements, and improvements made within the spirit and principle of the present invention shall fall within the protection scope of the present invention.

What is claimed is:

1. A carrier allocation method, the method comprising:
   acquiring a carrier hopping pattern by a base station, wherein the carrier hopping pattern includes carriers of a carrier set, wherein acquiring the carrier hopping pattern comprises determining a user equipment (UE) set served by a node on each carrier of the carrier set, wherein the determining the UE set is performed according to space angles of channel directions of UEs in the UE set, and wherein acquiring the carrier hopping pattern further comprises one of:
      determining, by the base station, the carrier hopping pattern according to an algorithm, channel state information, spatial channel direction, or channel service volume, or
      acquiring the carrier hopping pattern determined by another network device;
   sending, by the base station, carrier configuration information to a UE in the UE set, wherein the carrier configuration information comprises information about activating carrier hopping or the carrier hopping pattern, the carrier hopping pattern comprises a carrier set used by the user equipment in at least one time unit, and the carrier set comprises at least one carrier; and
   sending, by the base station, a signal to the UE or receiving a signal from the UE according to the carrier hopping pattern.

2. The method according to claim 1, wherein the sending, by the base station, a signal to the UE or receiving a signal from the UE according to the carrier hopping pattern comprises:
   sending, by at least one node of the base station, a signal to the UE or receiving a signal from the UE in a time unit determined by the carrier hopping pattern and on a carrier corresponding to the time unit.

3. The method according to claim 1, wherein the carrier hopping pattern is used to indicate a carrier set used by at least one node of the base station in at least one time unit within a period of the carrier hopping pattern to send a signal to the UE or receive a signal sent by the UE.

4. The method according to claim 1, wherein the sending, by the base station, a signal to the UE or receiving a signal from the UE according to the carrier hopping pattern comprises:
   sending, by the base station according to a first carrier hopping pattern, a data signal to the UE;
   receiving, by the base station according to a second carrier hopping pattern different from the first carrier hopping pattern, a data signal sent by the UE;
   sending, by the base station according to a third carrier hopping pattern different from the first and second carrier hopping patterns, a downlink reference signal to the UE; and
   receiving, by the base station according to a fourth carrier hopping pattern different from the first, second, and third carrier hopping patterns, an uplink reference signal sent by the UE.

5. A carrier allocation method, the method comprising:
receiving, by a user equipment (UE) in a UE set determined according to space angles of channel directions of UEs in the UE set and comprising UEs that are served by a node on each carrier of a carrier set, carrier configuration information sent by a base station, wherein the carrier configuration information comprises information about a carrier hopping pattern including carriers of the carrier set, wherein the carrier hopping pattern is determined according to an algorithm, channel state information, spatial channel direction, or channel service volume, wherein the carrier hopping pattern comprises a carrier set used by the UE in at least one time unit, and wherein the carrier set comprises at least one carrier; and
sending, by the UE, a signal to the base station or receiving a signal from the base station according to the carrier hopping pattern.

6. The method according to claim 5, wherein the sending, by the UE, a signal to the base station or receiving a signal from the base station according to the carrier hopping pattern comprises:
receiving, by the UE, a signal sent by at least one node of the base station or sending a signal to at least one node of the base station in a time unit determined by the carrier hopping pattern and on a carrier corresponding to the time unit.

7. The method according to claim 5, wherein the carrier hopping pattern
is determined by the base station or another network device.

8. The method according to claim 5, wherein the carrier hopping pattern is used to indicate a carrier set used by the UE in at least one time unit within a period of the carrier hopping pattern to send a signal to at least one node of the base station or receive a signal sent by at least one node of the base station.

9. The method according to claim 5, wherein the sending a signal to the base station or receiving a signal from the base station according to the carrier hopping pattern comprises:
receiving, by the UE according to a first carrier hopping pattern, a data signal sent by the base station;
sending, by the UE according to a second carrier hopping pattern different from the first carrier hopping pattern, a data signal to the base station;
receiving, by the UE according to a third carrier hopping pattern different from the first and second carrier hopping patterns, a downlink reference signal sent by the base station; and
sending, by the UE according to a fourth carrier hopping pattern different from the first, second, and third carrier hopping patterns, an uplink reference signal to the base station.

10. A base station comprising:
a processor;
a non-transitory computer readable medium having stored instructions that, when executed, cause the processor to acquire a carrier hopping pattern that includes carriers of a carrier set by determining a user equipment (UE) set served by a node on each carrier of the carrier set, wherein the UE set is determined according to space angles of channel directions of UEs in the UE set, and further by determining the carrier hopping pattern according to an algorithm, channel state information, spatial channel direction, or channel service volume; and
a transceiver configured to:
acquire the carrier hopping pattern from another network device,
send carrier configuration information to a UE in the UE set, wherein the carrier configuration information comprises information about activating carrier hopping or the carrier hopping pattern, the carrier hopping pattern comprises a carrier set used by a user equipment in at least one time unit, and the carrier set comprises at least one carrier, and
send a signal to the UE or receive a signal from the UE according to the carrier hopping pattern.

11. The base station according to claim 10, wherein through at least one node of the base station, the transceiver sends a signal to the UE or receives a signal from the UE in a time unit determined by the carrier hopping pattern and on a carrier corresponding to the time unit.

12. The base station according to claim 10, wherein the carrier hopping pattern is used to indicate a carrier set used by at least one node of the base station in at least one time unit within a period of the carrier hopping pattern to send a signal to the UE or receive a signal sent by the UE.

13. The base station according to claim 10, wherein
the transceiver sends, according to a first carrier hopping pattern, a data signal to the UE,
the transceiver receives, according to a second carrier hopping pattern different from the first carrier hopping pattern, a data signal sent by the UE,
the transceiver sends, according to a third carrier hopping pattern different from the first and second carrier hopping patterns, a downlink reference signal to the UE, and
the transceiver receives, according to a fourth carrier hopping pattern different from the first, second, and third carrier hopping patterns, an uplink reference signal sent by the UE.

14. A user equipment comprising a transceiver, wherein the transceiver is configured to:
receive carrier configuration information sent by a base station, wherein the carrier configuration information comprises information about a carrier hopping pattern that includes carriers of a carrier set comprising carriers having nodes serving user equipments (UEs) in a UE set that includes the user equipment and that is determined according to space angles of channel directions of UEs in the UE set, wherein the carrier hopping pattern is determined according to an algorithm, channel state information, spatial channel direction, or channel service volume, wherein the carrier hopping pattern comprises a carrier set used by a user equipment in at least one time unit, and wherein the carrier set comprises at least one carrier; and
send a signal to the base station or receive a signal from the base station according to the carrier hopping pattern.

15. The user equipment according to claim 14, wherein the transceiver receives a signal sent by at least one node of the base station or sends a signal to at least one node of the base station in a time unit determined by the carrier hopping pattern and on a carrier corresponding to the time unit.

16. The user equipment according to claim 14, wherein the carrier hopping pattern is determined by the base station or another network device.

17. The user equipment according to claim 14, wherein the carrier hopping pattern is used to indicate a carrier set used by the user equipment in at least one time unit within a period of the carrier hopping pattern to send a signal to at least one node of the base station or receive a signal sent by at least one node of the base station.

18. The user equipment according to claim 14, wherein
the transceiver receives, according to a first carrier hopping pattern, a data signal sent by the base station,
the transceiver sends, according to a second carrier hopping pattern different from the first carrier hopping pattern, a data signal to the base station,
the transceiver receives, according to a third carrier hopping pattern different from the first and second carrier hopping patterns, a downlink reference signal sent by the base station, and
the transceiver sends, according to a fourth carrier hopping pattern different from the first, second, and third carrier hopping patterns, an uplink reference signal to the base station.

19. The method according to claim 1, further comprising:
before sending or receiving the signal, sending, by the base station, corresponding carrier configuration information to a network node, wherein the network node is controlled by the base station and serves the UE, and wherein the corresponding carrier configuration information comprises part of or all of the carrier hopping pattern specific to the network node.

20. The base station according to claim 10, wherein the transceiver is further configured to send corresponding carrier configuration information to a network node, wherein the network node is controlled by the base station and serves the UE, and wherein the corresponding carrier configuration information comprises part of or all of the carrier hopping pattern specific to the network node.

* * * * *